(12) United States Patent
Tanaka et al.

(10) Patent No.: US 7,707,456 B2
(45) Date of Patent: Apr. 27, 2010

(54) STORAGE SYSTEM

(75) Inventors: Koichi Tanaka, Odawara (JP); Keiichi Tezuka, Yokohama (JP); Atsushi Ishikawa, Minamiashigara (JP); Azuma Kano, Hiratsuka (JP); Koji Arai, Odawara (JP); Yusuke Nonaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 509 days.

(21) Appl. No.: 11/702,495

(22) Filed: Feb. 6, 2007

(65) Prior Publication Data

US 2008/0091972 A1 Apr. 17, 2008

(30) Foreign Application Priority Data

Oct. 12, 2006 (JP) .............................. 2006-278237

(51) Int. Cl.
G06F 11/00 (2006.01)
(52) U.S. Cl. .............................................. 714/6; 714/7
(58) Field of Classification Search ...................... 714/6, 714/7

See application file for complete search history.

(56) References Cited

U.S. PATENT DOCUMENTS

| 5,371,882 | A | | 12/1994 | Ludlam | |
| 6,098,119 | A | * | 8/2000 | Surugucchi et al. | 710/10 |
| 6,598,174 | B1 | * | 7/2003 | Parks et al. | 714/6 |
| 6,845,465 | B2 | * | 1/2005 | Hashemi | 714/6 |
| 7,028,216 | B2 | * | 4/2006 | Aizawa et al. | 714/7 |
| 7,249,277 | B2 | * | 7/2007 | Arai et al. | 714/6 |
| 7,533,292 | B2 | * | 5/2009 | Van Gundy et al. | 714/7 |
| 2004/0064638 | A1 | * | 4/2004 | Chong, Jr. | 711/114 |
| 2004/0236908 | A1 | | 12/2004 | Suzuki et al. | |
| 2005/0050381 | A1 | | 3/2005 | Maddock | |
| 2005/0114728 | A1 | * | 5/2005 | Aizawa et al. | 714/6 |
| 2005/0204206 | A1 | * | 9/2005 | Arai et al. | 714/54 |
| 2007/0220313 | A1 | * | 9/2007 | Katsuragi et al. | 714/6 |

FOREIGN PATENT DOCUMENTS

| JP | 2004-348876 | 12/2004 |
| WO | WO 01/35244 | 5/2001 |
| WO | WO 02/061737 | 8/2002 |

* cited by examiner

*Primary Examiner*—Marc Duncan
(74) *Attorney, Agent, or Firm*—Brundidge & Stanger, P.C.

(57) ABSTRACT

Proposed is a storage apparatus capable of alleviating the burden of maintenance work when a failure occurs in a part configuring the storage apparatus. This storage apparatus includes multiple disk drives and spare disk drives, and multiple controllers. When a failure occurs, this storage apparatus determines the operability status of the storage apparatus based on failure information. When operation can be continued, the storage apparatus continues to operate without performing any maintenance such as part replacement, and if operation cannot be continued, data is migrated to another storage apparatus.

13 Claims, 21 Drawing Sheets

LU CONFIGURATION TABLE 142

| LU NUMBER | LU SIZE (BLOCKS) | RAID GROUP NUMBER | LU SETTING ORDER | RAID LEVEL | PHYSICAL DRIVE NUMBER |
|---|---|---|---|---|---|
| 0 | xx0 | 0 | 0 | 5 | 0-3 |
| 1 | xx1 | 1 | 1 | 0+1 | 4-7 |
| 2 | xx2 | 2 | 2 | 6 | 8-13 |
| 3 | xx3 | 0 | 3 | 5 | 0-3 |
| 4 | xx4 | 1 | 4 | 0+1 | 4-7 |
| : | : | : | : | : | : |

FIG.4

HOST CONNECTION MODE PARAMETER TABLE 144

| CONTROLLER NUMBER | PORT NUMBER | LU ALLOCATION STATUS | ALLOCATED LU NUMBER | HOST OS0 | HOST OS1 | HOST OS2 | ... |
|---|---|---|---|---|---|---|---|
| 0 | 0 | YES | 0, 1, 2, 3 | ○ | | | |
| | 1 | NO | | | | | |
| | 2 | NO | | | | | |
| | 3 | NO | | | | | |
| 1 | 0 | YES | 4 | | ○ | | |
| | 1 | NO | | | | | |
| | 2 | NO | | | | | |
| | 3 | NO | | | | | |
| : | : | : | : | : | : | : | : |

FIG.5

MOUNTED DISK DRIVE TABLE 146

| PHYSICAL DRIVE NUMBER | CAPACITY (GB) | ROTATING SPEED (rpm) |
|---|---|---|
| 0 | aa GB | bb rpm |
| 1 | ... | ... |
| : | : | : |
| n | ... | ... |

FIG.6

MOUNTED CONTROLLER TABLE 147

| CONTROLLER NUMBER | NUMBER OF PORTS |
|---|---|
| 0 | 4 |
| 1 | 4 |

FIG.7

DISK DRIVE MANAGEMENT TABLE 141

| SELF-APPARATUS<br>PHYSICAL DRIVE NUMBER | LOGICAL DRIVE NUMBER |
|---|---|
| 0 | 0 |
| 1 | 1 |
| 2 | 2 |
| 3 | 3 |
| : | : |
| OTHER-APPARATUS<br>PHYSICAL DRIVE NUMBER<br>(TO BE USED UPON MIGRATING DATA<br>FROM OTHER STORAGE APPARATUSES) | LOGICAL DRIVE NUMBER |
| 0 | - |
| 1 | - |
| 2 | - |
| 3 | - |
| : | : |

FIG.8

STORAGE APPARATUS REPLACEMENT NECESSITY SETTING TABLE 143

| DEFECTIVE PART | STORAGE APPARATUS REPLACEMENT NECESSITY | |
|---|---|---|
| CONTROLLER | REQUIRED | |
| DISK DRIVE | NUMBER OF UNUSED SPARE DISK DRIVES ≧ 1 | NOT REQUIRED |
| | NUMBER OF UNUSED SPARE DISK DRIVES = 0 | REQUIRED |
| FAN | REQUIRED | |
| POWER SUPPLY UNIT | REQUIRED | |
| : | : | |

FIG.9

FAILURE INFORMATION TABLE 155

| PART | | OPERATING STATE INFORMATION |
|---|---|---|
| CONTROLLER | CONTROLLER 110 | NO FAILURE |
| | CONTROLLER 120 | FAILURE |
| DISK DRIVE | DISK DRIVE 160a (PHYSICAL DISK NUMBER 0) | NO FAILURE |
| | DISK DRIVE 160a (PHYSICAL DISK NUMBER 1) | FAILURE |
| | : | : |
| SPARE DISK DRIVE | SPARE DISK DRIVE 160b (PHYSICAL DISK NUMBER m) | IN USE |
| | SPARE DISK DRIVE 160b (PHYSICAL DISK NUMBER m+1) | UNUSED |
| FAN | FAN 13a | NO FAILURE |
| | FAN 13b | NO FAILURE |
| | : | : |
| POWER SUPPLY UNIT | POWER SUPPLY UNIT 14a | NO FAILURE |
| | POWER SUPPLY UNIT 14b | NO FAILURE |
| : | : | : |

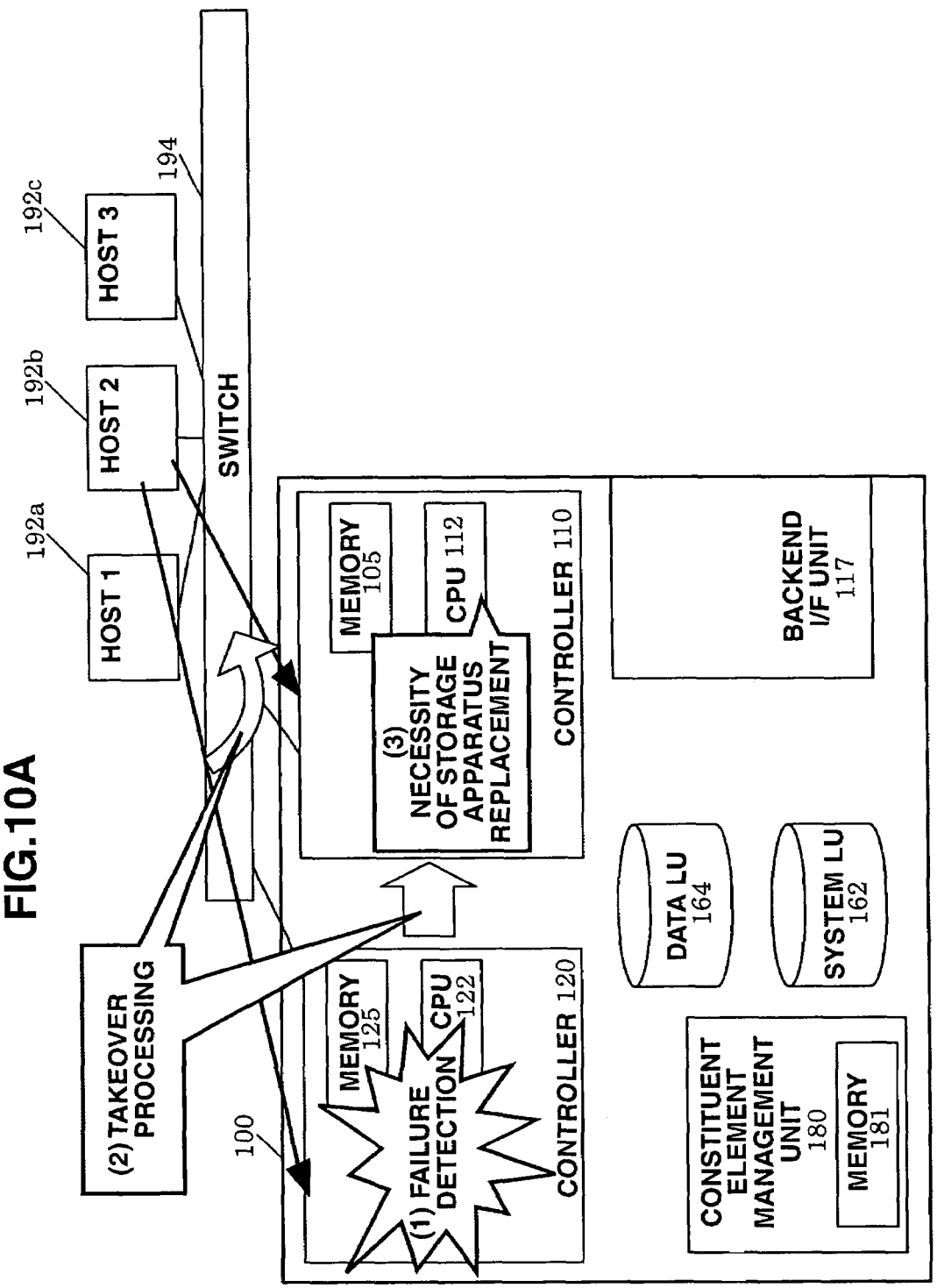

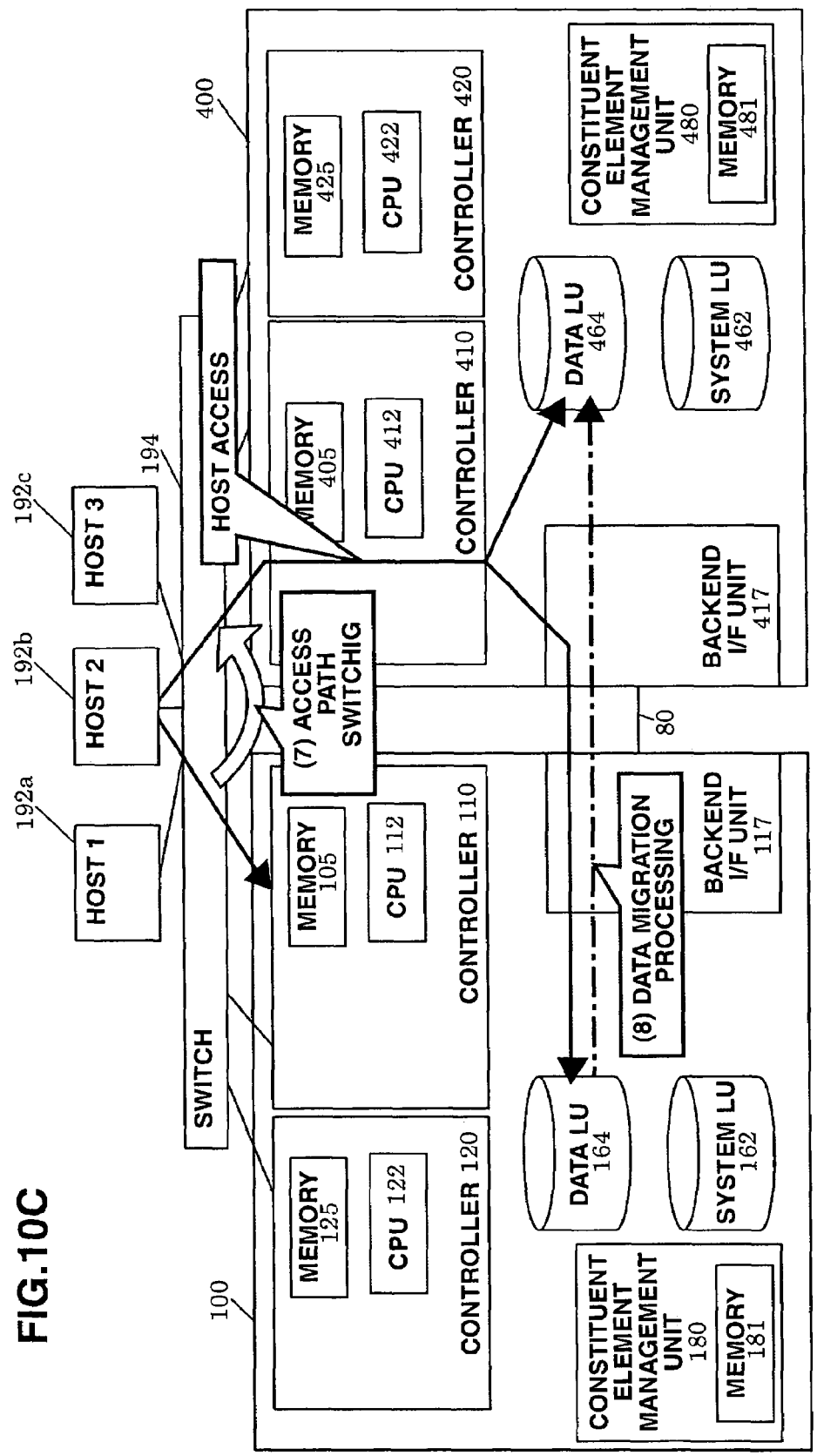

FIG.14
<BEFORE CHANGE>
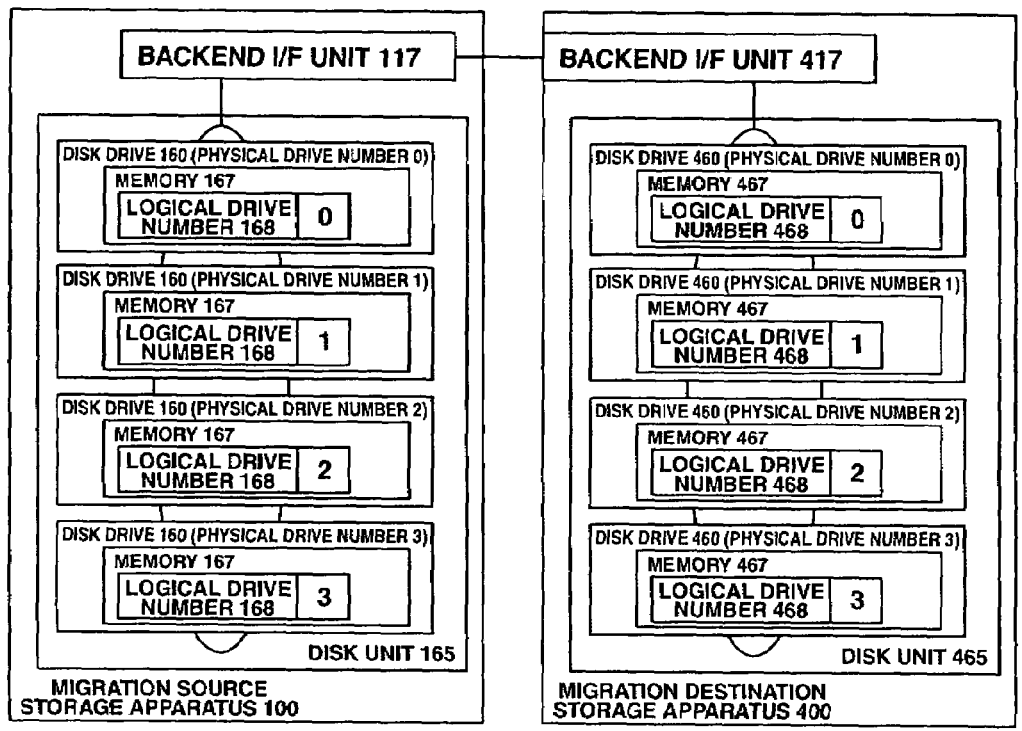
<AFTER CHANGE>
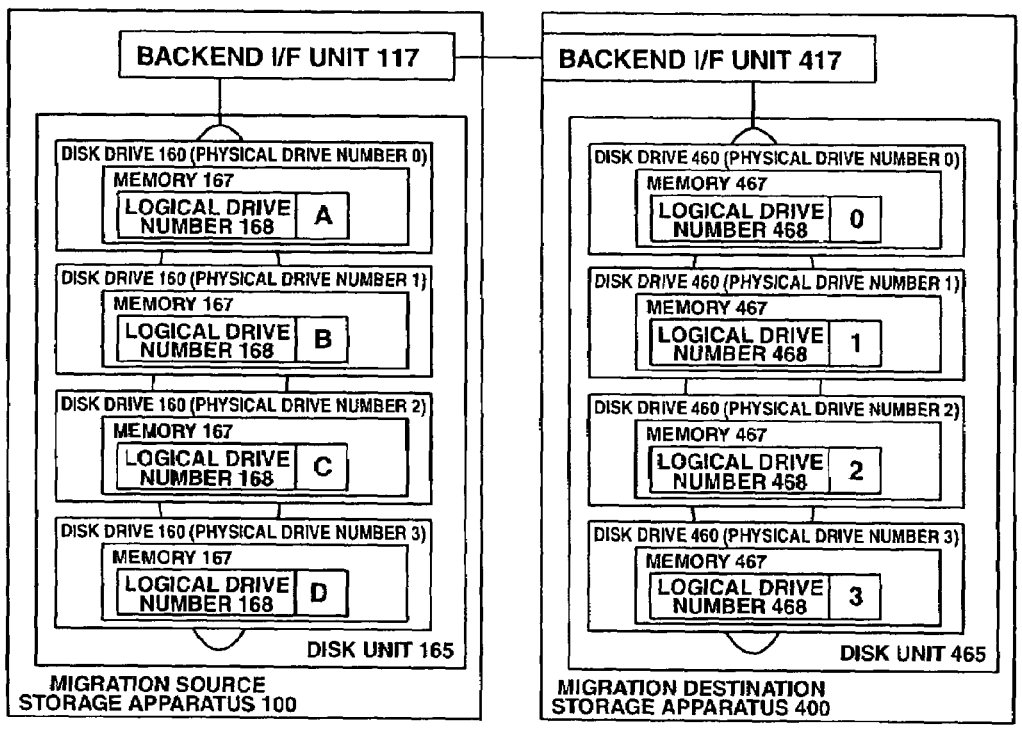

FIG.15A

DISK DRIVE MANAGEMENT TABLE OF MASTER

| SELF-APPARATUS PHYSICAL DRIVE NUMBER | LOGICAL DRIVE NUMBER |
|---|---|
| 0 | 0 |
| 1 | 1 |
| 2 | 2 |
| 3 | 3 |
| : | : |
| OTHER-APPARATUS PHYSICAL DRIVE NUMBER (TO BE USED UPON MIGRATING DATA FROM OTHER STORAGE APPARATUSES) | LOGICAL DRIVE NUMBER |
| 0 | A |
| 1 | B |
| 2 | C |
| 3 | D |
| : | : |

FIG.15B

DISK DRIVE MANAGEMENT TABLE OF MASTER

| SELF-APPARATUS PHYSICAL DRIVE NUMBER | LOGICAL DRIVE NUMBER |
|---|---|
| 0 | A |
| 1 | B |
| 2 | C |
| 3 | D: |
| : | |
| OTHER-APPARATUS PHYSICAL DRIVE NUMBER (TO BE USED UPON MIGRATING DATA FROM OTHER STORAGE APPARATUSES) | LOGICAL DRIVE NUMBER |
| 0 | - |
| 1 | - |
| 2 | - |
| 3 | - |
| : | : |

FIG.18

OPERATING DISK DRIVE TABLE

| PHYSICAL DRIVE NUMBER | ALLOCATION CAPAPCITY TO LU OF EACH DRIVE (BLOCKS) | ROTATING SPEED (rpm) |
|---|---|---|
| 0 | YY0+YY3 | bb rpm |
| 1 | YY0+YY3 | : |
| 2 | YY0+YY3 | : |
| 3 | YY0+YY3 | : |
| 4 | YY1+YY4 | : |
| 5 | YY1+YY4 | : |
| 6 | YY1+YY4 | : |
| 7 | YY1+YY4 | : |
| 8 | YY2 | : |
| 9 | YY2 | : |
| 10 | YY2 | : |
| 11 | YY2 | : |
| 12 | YY2 | : |
| 13 | YY2 | : |

FIG.19

OPERATING CONTROL TABLE

| CTL NUMBER | NUMBER OF PORTS |
|---|---|
| 0 | 1 |
| 1 | 1 |

STORAGE SYSTEM

CROSS REFERENCES

This application relates to and claims priority from Japanese Patent Application No. 2006-278237, filed on Oct. 12, 2006, the entire disclosure of which is incorporated herein by reference.

BACKGROUND

The present invention relates to a storage apparatus mounted with a plurality of disk drives storing data from a host computer (hereinafter simply referred to as a "host").

A storage apparatus, as described in Japanese Patent Laid-Open Publication No. 2004-348876, is mounted with a disk drive, a controller, and a power supply unit. With a conventional storage apparatus having this kind of configuration, individual parts can be replaced easily when a failure occurs.

SUMMARY

On the premise of adopting this kind of configuration enabling the easy replacement of individual parts, a system engineer needs to visit the site and replace the part each time a failure occurs. A storage apparatus is equipped with numerous parts including a plurality of disk drives, controllers, power supply units and the like, and the life of the respective parts is not uniform. Thus, a system engineer needs to visit the site numerous times.

The present invention was made in view of the foregoing problems. Thus, an object of this invention is to provide a storage apparatus capable of alleviating the workload of a system engineer.

In order to achieve the foregoing object, the present invention provides a storage apparatus comprising a plurality of disk drives and spare disk drives, and a plurality of controllers. When a failure occurs, this storage apparatus determines the operability status of the storage apparatus based on failure information. When operation can be continued, the storage apparatus continues to operate without performing any maintenance such as part replacement, and if operation cannot be continued, the storage apparatus itself is replaced. When replacing the storage apparatus, the data migration destination storage apparatus for replacement acquires configuration information of the defective data migration source storage apparatus, and takes over the processing by executing data migration upon setting the configuration based on the acquired configuration information.

According to the present invention, it is possible to provide a storage apparatus capable of alleviating the workload of a system engineer.

DESCRIPTION OF DRAWINGS

FIG. 4 is a diagram showing a host connection mode parameter table;

FIG. 5 is a diagram showing a mounted disk drive table;

FIG. 6 is a diagram showing a mounted controller table;

FIG. 7 is a diagram showing a disk drive management table;

FIG. 8 is a diagram showing a storage apparatus replacement necessity setting table;

FIG. 9 is a diagram showing a failure information table;

FIG. 10A is a diagram explaining data migration processing;

FIG. 10C is a diagram explaining data migration processing;

FIG. 14 is a diagram explaining logical drive number change processing;

FIG. 15A is diagram explaining disk drive management table update processing;

FIG. 15B is diagram explaining disk drive management table update processing;

FIG. 18 is a diagram showing an operating disk drive table;

FIG. 19 is a diagram showing an operating controller table;

DETAILED DESCRIPTION

Figure 1A:
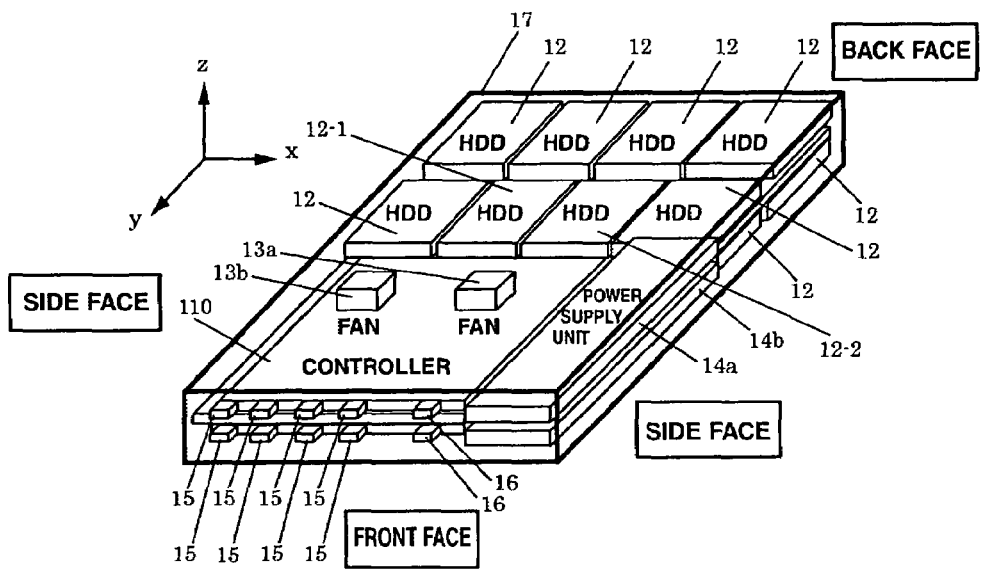
FIG. 1A to 1C are overviews of the configuration of a storage apparatus.

Embodiments of the present invention are now explained with reference to the attached drawings.

In the first embodiment of the present invention, a storage apparatus comprises a disk drive, a controller, a fan, and a power supply unit. As the disk drive, for instance, a hard disk drive (hereinafter referred to as an "HDD"), a DVD drive or a magnetic tape drive may be used. Further, a flash memory may be used instead of a disk drive.

The respective components of disk drive, controller, fan, and power supply unit may be configured to include a replacement part. A replacement part includes a part that is not operated until the occurrence of a failure and which takes over the processing as a replacement of the defective part, as well as a part that is being operated even before the occurrence of a failure and which performs the processing of the defective part in addition to the processing that it was performing up to the occurrence of such failure.

Specifically, a spare disk drive that operates during a disk drive failure can be used as the former replacement part, and a redundant controller, fan, or power supply unit can be used as the latter replacement part. A specific example of this configuration is explained below.

A storage apparatus uses RAID (Redundant Array of Inexpensive Disks) technology to set a plurality of LUs (Logical Units) in a storage extent of a disk drive. An LU is a logical storage extent set in a physical storage extent of the disk drive, and can be provided by the controller to a host as storage extent units. A plurality of disk drives to which LUs are set with RAID are referred to as a RAID group. When one of the disk drives among the disk drives configuring the RAID group is subject to a failure, data of the other disk drives configuring the RAID group can be used to restore the data of the defective disk drive. Reliability against failure in a disk drive can thereby be improved. The restored data is stored in the spare disk drive.

The storage apparatus may adopt a configuration of comprising a first controller and a second controller. For example, in a case where the first controller and the second controller are respectively in charge of transferring data of separate LUs, the first controller and the second controller control the transfer of data to the LU that the respective controllers are in charge of when there is no failure, and, when the first controller is subject to a failure, the second controller controls the data transfer of both LUs; namely, the LU handled by the first controller and the LU handled by the second controller.

Regarding the fan and power supply unit, as with the case of the controllers described above, the configuration may be such that another fan that was operating up to the occurrence of a failure performs the processing of the defective part (fan).

Incidentally, the foregoing configuration is merely an example, and it is also possible to adopt a configuration where the disk drive is the latter replacement part; that is, a part that is not operated until the occurrence of a failure and which takes over the processing as a replacement of the defective part, and a configuration where the controller, fan or power supply unit is the former replacement part; that is, a part that is being operated even before the occurrence of a failure and which performs the processing of the defective part in addition to the processing that it was performing up to the occurrence of such failure. When using the replacement part of the disk drive as the latter replacement part, data stored in the defective disk drive will be restored by the RAID group, and thereafter stored in an empty area of the disk drive that was operating before the occurrence of the failure.

<External Configuration>

Figure 1B:
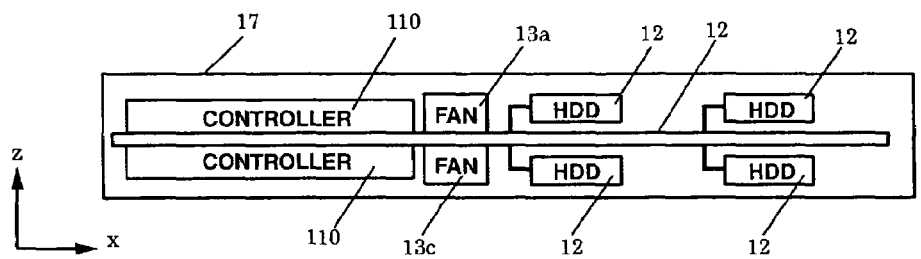
Figure 1C:
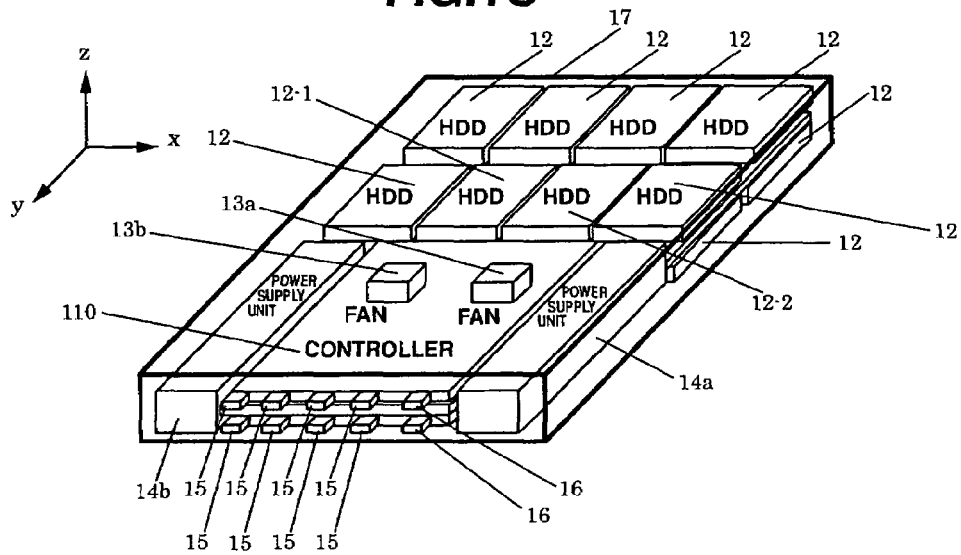

FIG. 1A to 1C show examples of the configuration of the storage apparatus.

FIG. 1A is a cubic diagram, and FIG. 1B shows the cross section of the storage apparatus illustrated in FIG. 1A.

The storage apparatus 100 is configured by including an HDD 12, a fan 13, a power supply unit 14, a controller 110, a host port 15, and a storage apparatus port 16, and these components are covered with a case 17. Incidentally, the case 17 is used for realizing a configuration where parts cannot be replaced easily, and does not necessarily have to be air tight. The case 17 has portions for connecting to other apparatuses, portions for operating switches and the like, air vents for cooling and so on. As a result of making the replacement of parts difficult as described above, for instance, it is possible to prevent the accidental connection of a substandard HDD. Further, by avoiding the presumption that parts are to be replaced, the freedom of arranging parts will increase, and the mounting density of parts can be increased in comparison to conventional technology.

FIG. 1B is a cross section of the storage apparatus, and shows the configuration where components in the sequence of controller 110, fan 13, HDD 12, HDD 12 is mounted on both sides of the substrate from the front face toward the back face. In order to downsize the storage apparatus, this configuration gains capacity by arranging the HDDs 12 transversely, and arranging two rows of HDDs from the front face toward the back face.

Meanwhile, as shown in FIG. 1A, when the HDDs are arranged transversely and four HDDs are arranged in the X direction, this will basically coincide with the standard measurement when arranging 3.5-inch HDDs vertically in the x direction. Thus, racks that were used to previously store the storage apparatus can be used again without change.

Further, the fans 13 can also be arranged in locations of optimal cooling efficiency so as to improve such cooling efficiency. With this storage apparatus, as shown in FIG. 1B, the fans are provided between the controller 110 and HDDs 12 so as to send the heat from the controller 110 toward the HDDs.

Incidentally, the use of the case 17 to cover the components will achieve a dust-proof effect, and it will also be possible to lower the probability of a failure occurring in the respective parts. Two power supply units 14 are mounted as shown in FIG. 1A. Among the two power supply units 14, the power supply unit 14 arranged at the upper side (plus Z direction) supplies power to the controller 110, fan 13, and HDDs 12 located above the substrate 10 shown in FIG. 1B, and the power supply unit 14 arranged at the lower side (minus Z direction) supplies power to the controller 110, fan 13, and HDDs 12 located below the substrate 10. Further, the power supply units 14 are respectively connected to the first controller 110, fan 13, and HDDs 12 located both above and below the substrate 10, and, when one of the power supply units 14 is subject to a failure, the other power supply unit 14 supplies power to all controllers 110, 120, fans 13, and HDDs 12. In addition to the power supply units 14 being arranged in the vertical direction (z direction) as shown in FIG. 1A, a configuration of arranging these in the front and back direction (x direction), or as shown in FIG. 1C may be adopted. As a result of adopting the arrangements shown in FIG. 1A and FIG. 1C, it is possible to realize a symmetrical configuration for the parts arrangement on the upper side and the parts arrangement on the lower side. As a result, the fans 13 that are symmetrically arranged in a vertical manner will enable the same cooling in both the upper and lower sides, and the cooling efficiency can be improved when adopting the same fans. Moreover, the design and manufactured can also be facilitated by such vertical symmetry. Meanwhile, when the vertical size of the power supply unit is approximate to the size upon arranging two or more 3.5-inch HDDs 12 as shown in FIG. 1A, and the size of the front and back direction (x direction) is approximate to the half the size of the front and back direction of a standard controller 110, the power supply unit 14 can be arranged in the front and back direction (x direction) to downsize the storage apparatus.

<Overall Configuration>

Figure 2A:
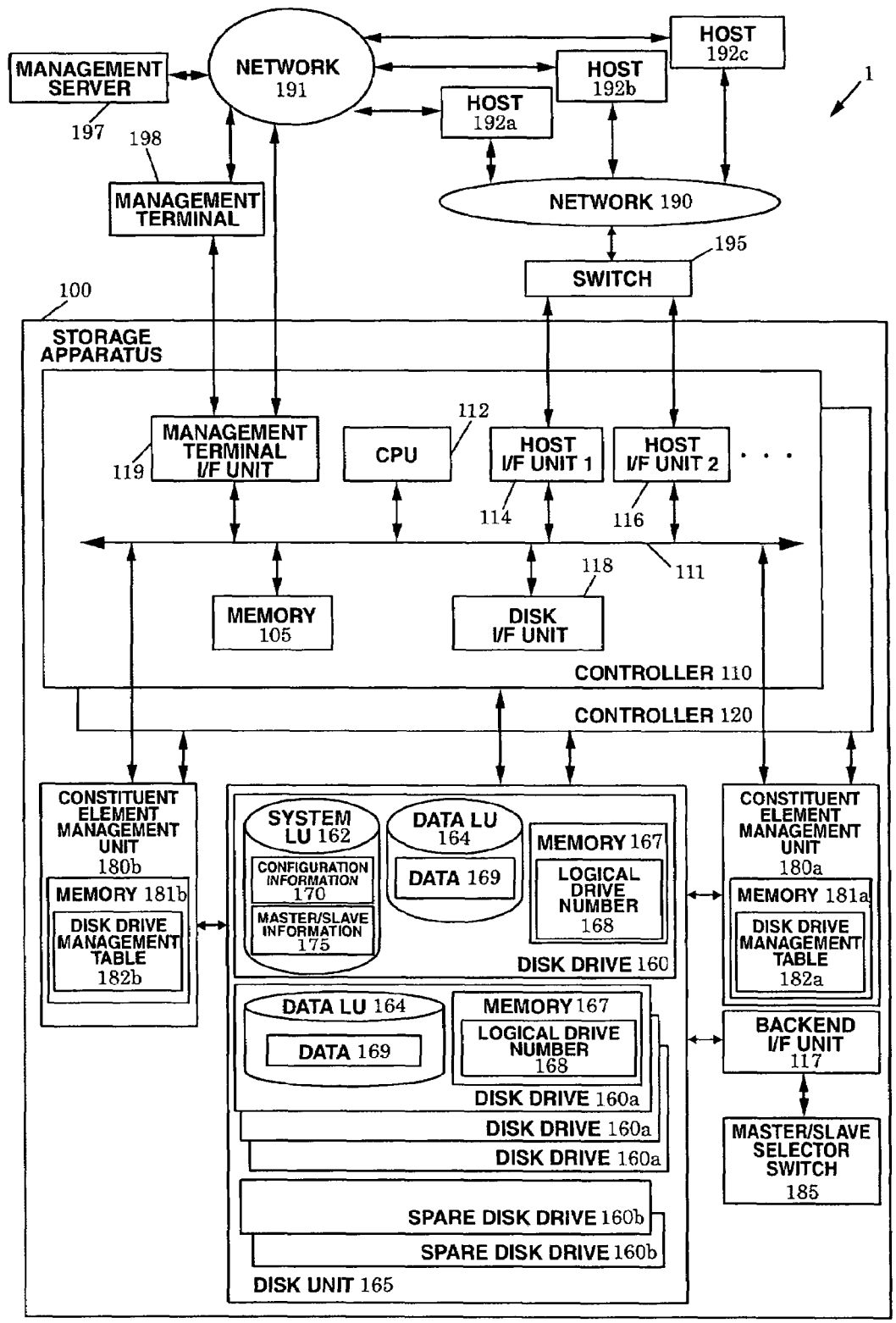
FIG. 2A is a diagram showing the configuration of a system using the storage apparatus.

FIG. 2A shows the configuration of the overall system using the storage apparatus. This system has a storage apparatus 100, hosts 192a to 192c, a management terminal 198, and a management server 197, and the storage apparatus 100 and the hosts 192a to 192c are connected via a first network 190, and the storage apparatus 100 and the management terminal 198, management server 197, and hosts 192a to 192c are connected via a second network 191. The first and second networks may be any type of network. For example, these may be networks using SCSI, IP protocol or the like.

The storage apparatus 100 has a plurality of controllers 110, 120, a disk unit 165, constituent element management units 180a, 180b, a backend interface (I/F) unit 117, and a master/slave selection switch 185.

The disk unit 165 has a plurality of disk drives 160. Each disk drive 160 has a disk not shown, and a semiconductor memory 167.

The controllers 110, 120 have the same configuration, and the example of the controller 110 is now explained. The controller 110 controls the data transfer between the host 192 and the disk drive in response to an access request such as a write or read request sent from the host 192. The controller 110 has a CPU 112, a plurality of host interface (I/F) units 114, 116, a disk interface (I/F) unit 118, a management terminal interface unit 119, and a memory 105, and these are mutually connected via an internal bus 111 in a communicable manner. Here, although the configuration shows the storage apparatus 100 having two controllers, the configuration may be of having only one controller, or having three or more controllers.

The CPU 112 is used for executing programs stored in the memory 105, and thereby controls the data transfer among the host I/F units 114, 116, the disk drive 160, and the cache extent. Here, although the configuration shows an example of having one CPU 112, a plurality of CPUs may also be provided. Further, the CPU 112 may also possess a plurality of processing units to become the center of the CPU such as a multi-core processor.

The host I/F units 114, 116 both function as an interface of the network 190 and the internal bus 111.

The disk I/F unit 118 is communicably connected to the disk drive 160 storing data to function as an interface of the internal bus 111 and the disk drive 160, and controls the input and output of data to and from the disk drive 160.

The management terminal I/F unit 119 functions as an interface of the storage apparatus 100, the management terminal 198 and the network 191.

The backend interface unit 117 functions as an interface of the disk drive 160 and other storage apparatuses 400. As a result of the backend interface unit 117 being connected to the disk drive without being disposed in the controllers 110, 120, it is possible to execute the reading of configuration information 170 and the data migration processing when a failure occurs in the storage apparatus 100.

The first to third hosts 192a to 192c are hosts that use the storage apparatus 100. The first to third host 192a to 192c may be connected to the storage apparatus 100 via a switch, connected to the storage apparatus 100 via the network 190 without going through a switch, or connected directly to the storage apparatus without going through the network 190.

The management terminal 198, for instance, is configured from a laptop computer, and provides a user interface such as a GUI (Graphical User Interface) or CLI (Common Line Interface) required in operations by the system engineer concerning changes in the configuration information 140 such as when creating a logical unit or setting security.

The management server 197 is communicably connected to the first to third hosts 192a to 192c via the network 191, and sets items in the host.

Figures 2B, 2C, 3:
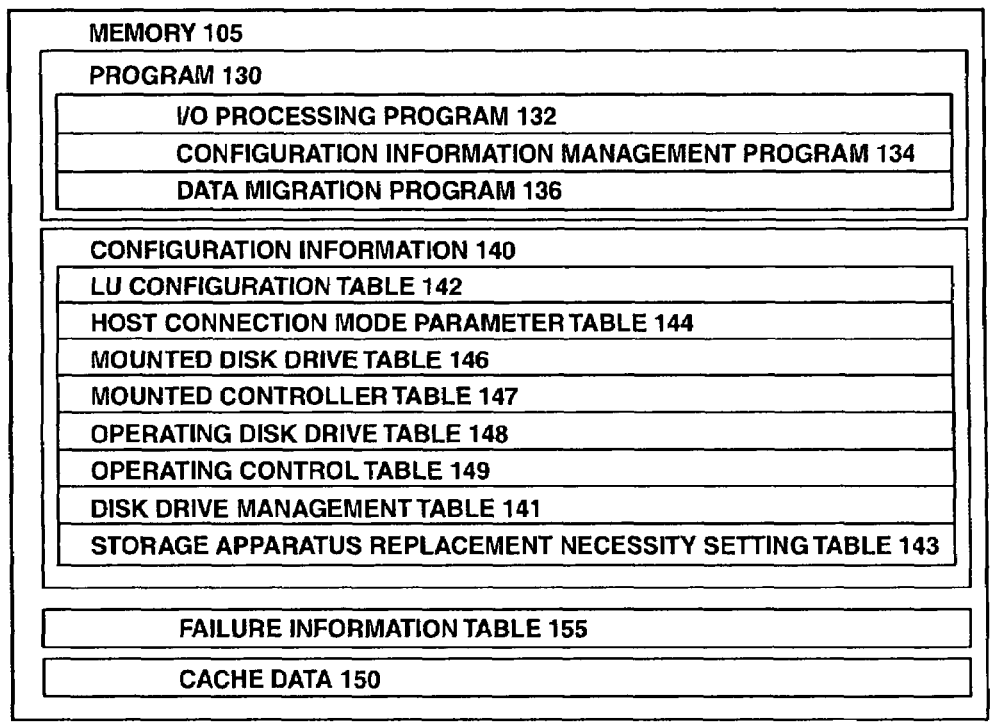
FIG. 2B is a diagram showing the configuration of a system using the storage apparatus.
FIG. 2C is a diagram showing the configuration of a system using the storage apparatus.
FIG. 3 is a diagram explaining an LU configuration table.

FIG. 2B shows the information stored in the memory 105. The memory 105 stores a program 130, configuration information 140 of the storage apparatus 100, and a failure information table 155. The memory 105 is further provided with a cache extent for temporarily storing cache data 150 to be transferred between the host 192 and the disk drive 160.

As the program 130, there are an I/O processing program 132 for processing an access request from the host 192, a configuration information management program 134 for managing the configuration information 140, a data migration program 136 for executing the data migration processing from other storage apparatuses, and other programs.

The I/O processing program 132 is a program for executing the basic functions of the controller 110, and interprets commands that the first or second host interface unit 114, 116 received from the host 192. When such a command relates to the input and output of data, in order to reply to such a command, the I/O processing program 132 implements the data transfer between the storage medium and the cache extent included in the disk drive 160, or the data transfer between the cache extent and the host 192.

Whereas the host 192 designates the storage location of data to be subject to the I/O request in a part of LUN (Logical Unit Number; hereinafter sometimes referred to as an "LU number") and a logical block address (LBA), the I/O to and from the disk drive 160 is designated based on the identifier of the disk drive and the LBA in the storage medium. Thus, the I/O processing program 132 performs processing for converting the address based on the LU configuration table 142 contained in the configuration information 140, and accesses the disk drive of the data storage destination.

The configuration information management program 134 is a program for managing and updating the respective tables configuring the configuration information 140 described in FIG. 2 above.

The data migration program 136 is a program for executing the data migration described later. The data migration program 136 executes processing for acquiring and storing data/configuration information stored in the used storage apparatus when the storage apparatus needs to be replaced.

The configuration information 140, in addition to the LU configuration table 142, is configured from a host connection mode parameter table 144, a mounted disk drive table 146, a mounted controller table 147, an operating disk drive table 148, an operating controller table 149, a disk drive management table 141, a storage apparatus replacement necessity setting table 143, and the like.

Among the plurality of disk drives 160, a certain disk drive 160 configures both the data LU 162 and the data LU 164, and the other disk drives 160 configure the data LU 164. The system LU 162 stores the configuration information 170 as the copy of the configuration information 140, and the master/slave information 175 showing the data migration destination/data migration source. Incidentally, the master represents the data migration destination storage apparatus, and the slave represents the data migration source storage apparatus. The data LU stores the data 169 sent from the host 192. Further, the disk drive 160 comprises a memory 167 for storing a logical drive number 168.

The constituent element management unit 180 manages the constituent elements of the storage apparatus such as performing the opening and closing of the disk drive 160 configured from the LSI arranged on the substrate 10 and a memory 181, and controlling the power supply unit 14 and the fan 13. The logical drive number will be explained later with reference to FIG. 13 to FIG. 15.

FIG. 2C shows the configuration information 170 stored in the system LU 162. The configuration information 170 stores the copies of the respective tables of the configuration information 140 stored in the memory 105.

The various tables are now explained.

FIG. 3 shows an LU configuration table. The LU configuration table 142, for each LU, is set with an LU number, an LU size, a RAID group number, an LU setting order, a RAID level, and a physical drive number. The LU number is a number for uniquely identifying the LU in the storage apparatus 100. The LU size shows the LU capacity. The RAID group is a plurality of disk drives grouped for configuring the RAID, and the RAID group number is a number given to such group. The LU setting order shows the order in which the LUs were set. The RAID level shows the RAID level applied to each LU. The physical drive number shows the physical number of the disk drive providing the storage extent to each LU.

FIG. 4 shows a host connection mode parameter table. The controller number is a number for identifying the first controller 110 and the second controller 120. The port number is a number for identifying the ports connected to the hosts 192*a* to 192*c* comprising the respective controllers. For each port, an LU allocation status showing whether an LU has been allocated and an LU number in a case when such allocation has been made are managed. The host OS0, host OS1, . . . respectively show the setting of each port; specifically, to which mode corresponding to which type of host OS each port has been set.

FIG. 5 shows a mounted disk drive table. The mounted disk drive table 146 is set with the physical drive number, capacity, and rotating speed for identifying the respective disk drives provided to the storage apparatus 100.

FIG. 6 shows a mounted controller table. The mounted controller table 147 is set with the number of ports provided to each first controller 110 (for instance, controller number 0) and second controller (for instance, controller number 1).

FIG. 7 shows a disk drive management table. The disk drive management table 141 is set with the association of a physical drive number as the identifier of the disk drive managed according to FIG. 5 or the like, and a logical drive number designated upon access from the controllers 110 and 120. In the disk drive management table 141, the self-apparatus physical drive number manages the association of the physical drive number/logical drive number in the self-apparatus, and a physical drive number of other apparatuses is a management area to be used during the data migration from other storage apparatuses. Details will be explained in the inter-storage apparatus backend connection processing with reference to FIG. 13 to FIG. 15.

FIG. 8 shows a storage apparatus replacement necessity setting table. The storage apparatus replacement necessity setting table 143 sets, for each part, whether to continue operating or to replace the storage apparatus when a failure occurs in the respective parts such as the controllers 110 and 120, disk drive 160, spare disk drive, fan, and power supply unit configuring the storage apparatus 100. Incidentally, although the present embodiment illustrates a case of setting the data migration necessity in the storage apparatus replacement necessity setting table 143 during a failure in the respective controllers, disk drives, spare disk drives, fans, and power supply units, for instance, it is also possible to set the necessity of replacing the storage apparatus only regarding the disk drive, and, without managing the other parts, requiring the replacement of the storage apparatus in all cases.

FIG. 9 shows a failure information table 155.

The failure information table 155 is used for setting the failure status of the respective parts; namely, the controllers, disk drives, spare disk drives, fans, and power supply units. When a failure is detected, the detected failure information is added to this failure information table 155. FIG. 9 shows that status where a failure has occurred in the first controller and the second disk drive, and a first spare disk drive is being used.

Incidentally, the operating disk drive table 148 and the operating controller table 149 will be described later with reference to FIG. 18 and FIG. 19.

<Storage Apparatus Replacement Processing>

Figure 10B:
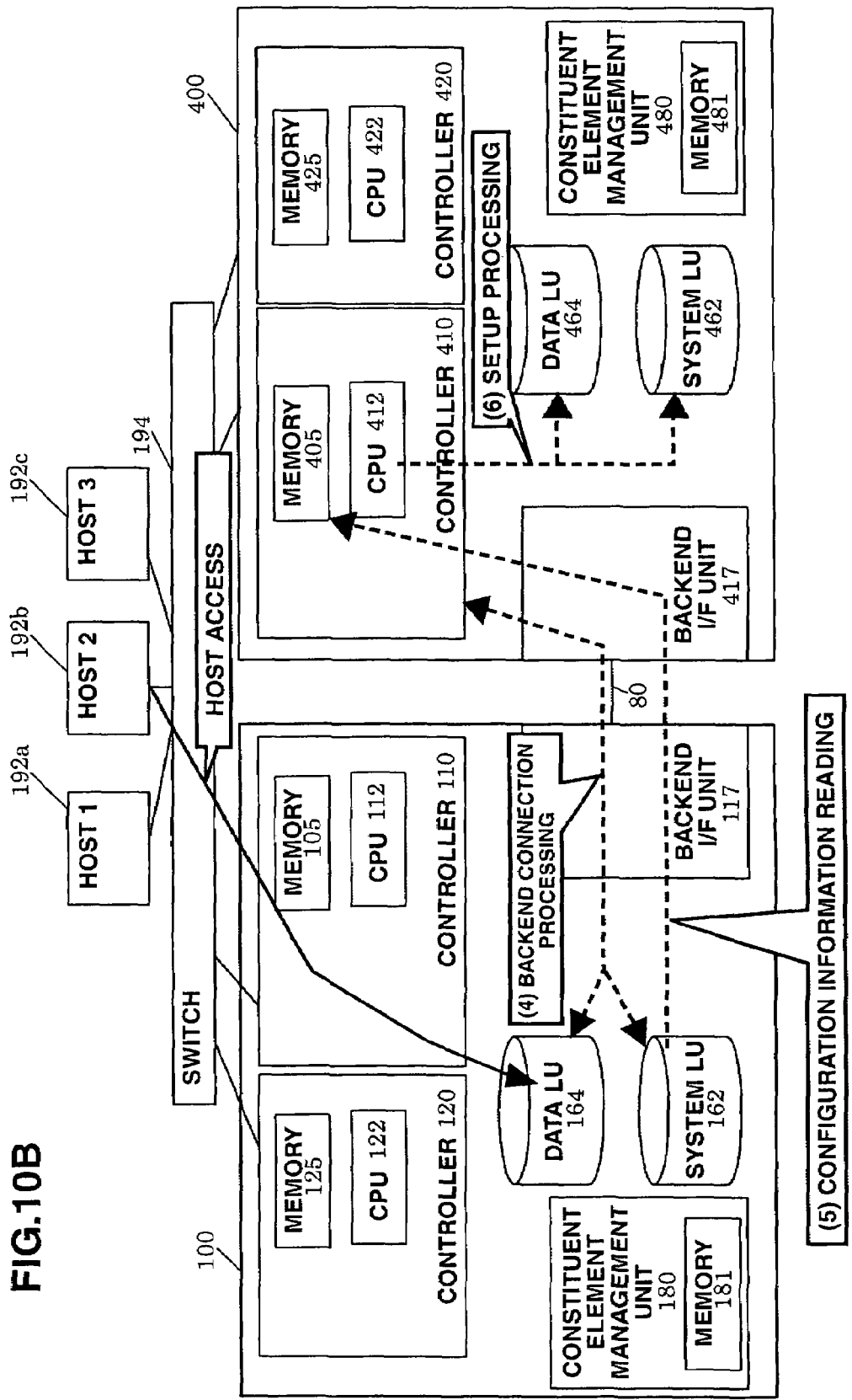
FIG. 10B is a diagram explaining data migration processing.

FIG. 10A to 10C are image diagrams of the storage apparatus replacement processing in the present embodiment. In this embodiment, an example is explained for a case where the storage apparatus 100 to become a data migration source (hereinafter also referred to as a "migration source storage apparatus") and the storage apparatus 400 to become a migration destination (hereinafter also referred to as a migration destination storage apparatus) are configured the same. Nevertheless, even if the configuration or performance of the migration source storage apparatus and the migration destination storage apparatus is different, so as long as these are equipped with a CPU capable of performing the processing described later, and an appropriate interface, the same type of data migration can be performed.

Here, a case is explained where a failure occurred in the controller 120 of the storage apparatus 100. The processing contents shown in FIG. 10A to 10C are as follows. (1) A failure occurred in the controller 120, (2) takeover from the controller 120 to the controller 110 is performed, (3) the controller 110 determines the replacement necessity of the storage apparatus 100 as "required", (4) backend processing between the migration source storage apparatus 100 and the migration destination storage apparatus 400 is performed, (5) the controller 410 of the migration destination storage apparatus 400 acquires configuration information from the system LU of the migration source storage apparatus 100 and stores the same, (6) a logical configuration is set in the LU (system LU, data LU) of the migration destination storage apparatus 400 based on the configuration information acquired by the migration destination storage apparatus 400, (7) the access path of the host 192 is switched from the migration source storage apparatus to the migration destination storage apparatus, and (8) data is copied from the LU of the migration source storage apparatus 100 to the LU of the migration destination storage apparatus 400 subject to the logical configuration setting. In the foregoing processing, since the migration destination storage apparatus 400 takes over the configuration information of the migration source storage apparatus 100, sets the logical configuration, and copies data, it is possible to alleviate the burden on the system engineer regarding data migration processing.

Incidentally, with respect to the host access, from after the takeover processing at (2) to before the access path switching processing at (7) shown in FIG. 10A to 10C, these processes are performed to the data LU 164 configured from the disk drive 160 via the controller 110, and the processes after the switching of the access path at (7) are performed to the data LU 164 configured from the disk drive 160 and the data LU 464 configured from the disk drive 460 via the controller 410.

Figure 11:
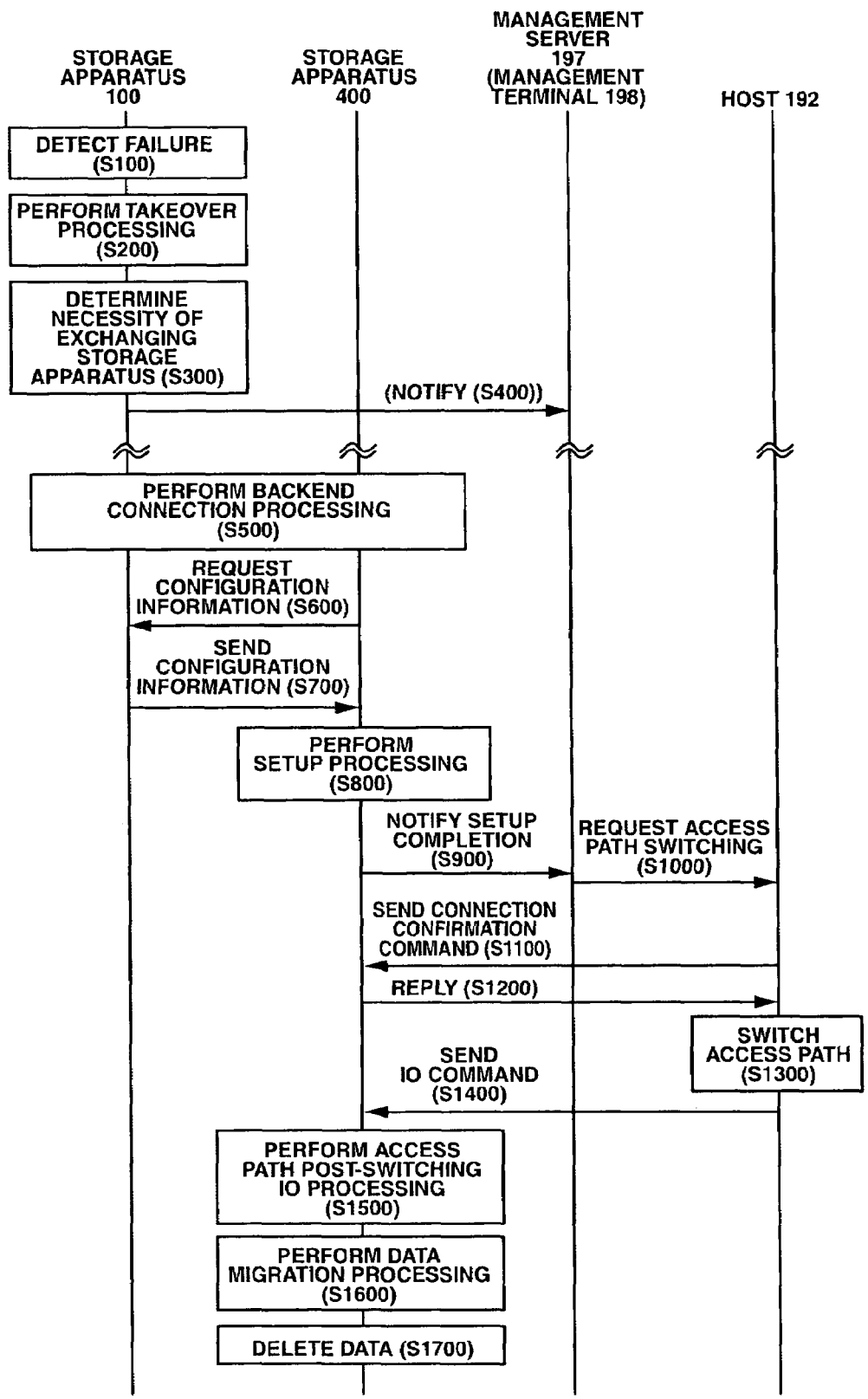
FIG. 11 is a flowchart of storage apparatus replacement processing.

FIG. 11 shows the flow of storage apparatus replacement processing in a case when a failure occurs in the storage apparatus shown in FIG. 10A to 10C. The constituent element management unit 180 monitors the status of the parts such as the disk drive 160, controllers 110, 120, fan 13, and power supply unit 14, and determines that a failure has occurred when there is a change in such status. For example, if a heartbeat signal is sent from the respective parts to the constituent element management unit 180, a failure is determined when this signal can no longer be detected (S100).

When the constituent element management unit 180 determines a failure, it sends a notice regarding the occurrence of a failure to the CPU 112, and the CPU 112 sets information concerning such failure in the failure information table 155 of the memory 105. Incidentally, when a failure occurs in the controller 110, a notice indicating the occurrence of a failure is sent to the CPU of the controller 120, and information concerning such failure is stored in the failure information table of the memory 125 in the controller 120. Thereupon, the constituent element management unit 180 recognizes that a failure occurred in a part, and executes takeover processing using a replacement part if there is such replacement part of the defective part. As shown in FIG. 1A, when a failure occurs in a controller, the switching of the host access path is performed between the controller to take over the processing and the host 192 (S200). Thereafter, the CPU 112 in the controller 110 of the storage apparatus 100 (CPU 122 of the controller 120 when a failure occurs in the controller 110) determines whether it is possible to continue operation with the storage apparatus 100. When it is determined that operation cannot be continued, this implies that an operation with another storage apparatus; that is, the replacement of the storage apparatus is required (S300). When the storage apparatus needs to be replaced, the controller 110 or the controller 120 notifies the management server 197 to such effect and urges the system engineer to connect the replacement storage apparatus 400. Incidentally, the notice may be sent to the management terminal 198 instead of the management server 197 (S400). After the storage apparatus 100 and the storage apparatus 400 are connected according to the notice, backend connection (S500), reading of configuration information by the storage apparatus 400 (S600, 700), and setup processing (S800) are executed. The setup processing is complete, the migration destination storage apparatus 400 notifies the management server 197 that the setup is complete, and IO commands from the host can be received (S900). Based on the notice received at S900, the management server 197 sends a host access switch request to the host 192 (S1000). The host 192 sends a connection confirmation command to the migration destination storage apparatus 400 (S1000), and, upon receiving a reply from the migration destination storage apparatus 400 (S1200), it switches the access path (S1300). Thereby, the access path to which an IO command is sent from the host 192 is switched from the migration source storage apparatus 100 to the migration destination storage apparatus 400, and the IO command is sent to the migration destination storage apparatus 400 (S1400). After the access path has been switched, the storage apparatus 400 executes access path post-switching IO processing (S1500). Subsequently, the storage apparatus 400 executes data migration processing for copying data of the storage apparatus 100 to the storage apparatus 400 (S1600). Incidentally, the data migration processing at S1600 can be executed in parallel with the processing at S900 to S1500, or executed between the processing at S900 to S1500. For instance, after the setup processing at S800 is complete, the processing at S1600 can be executed instead of S900. When the copying of data of the storage apparatus 100 is completed based on the data migration processing, the storage apparatus 400 executes data deletion processing for deleting data of the storage apparatus 100 (S1700).

The processing at S100 to S1700 is now explained. Foremost, the storage apparatus replacement necessity determination processing at S300 is described in detail.

<Necessity Determination of Storage Apparatus Replacement>

Figure 12:
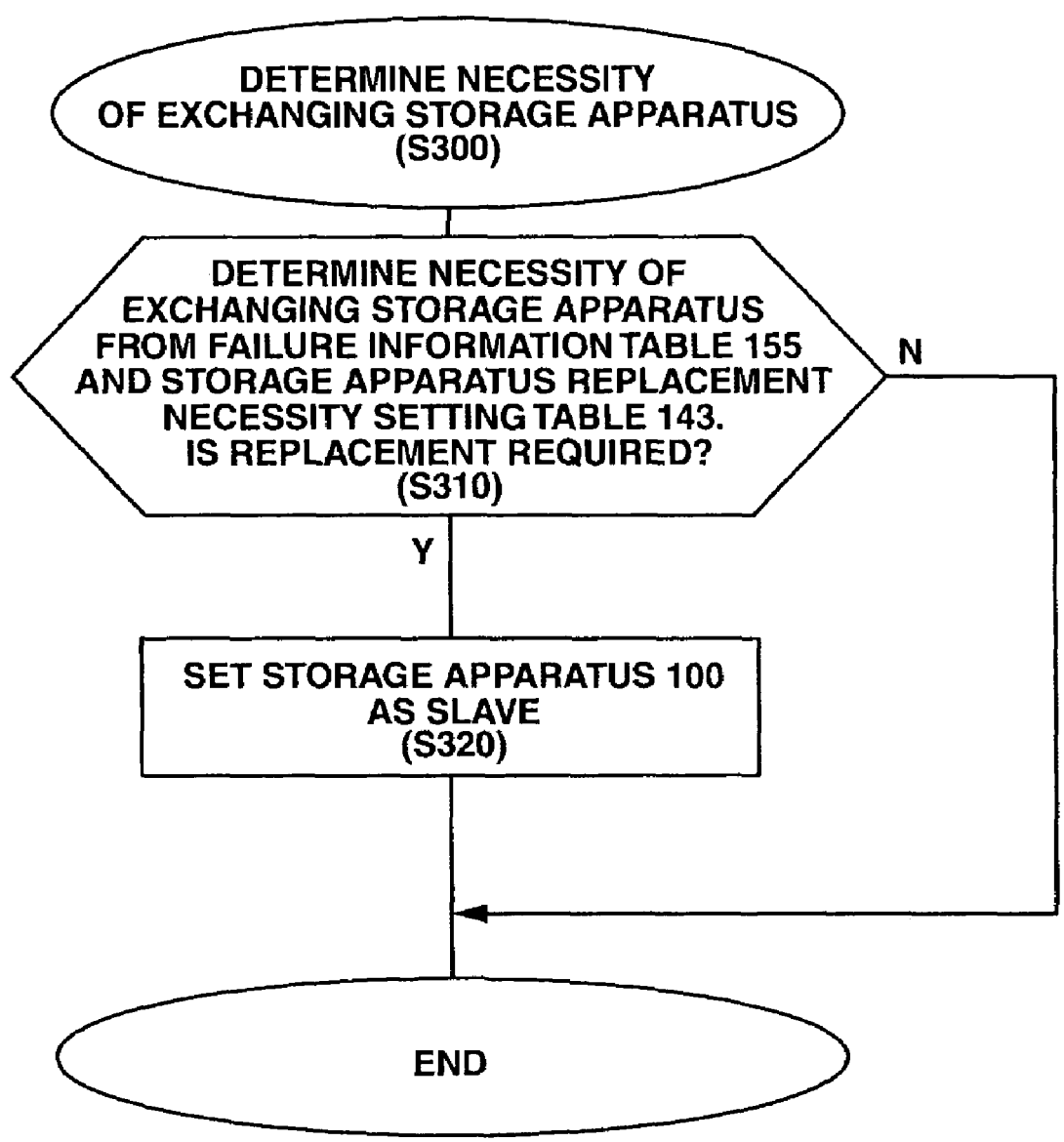
FIG. 12 is a flowchart of storage apparatus replacement necessity determination processing.

FIG. 12 shows the details of the processing for determining the necessity to replace the storage apparatus. In the storage apparatus replacement necessity determination processing at S300, foremost, it is determined whether operation with the storage apparatus 100 can be continued based on the failure information table 155 and the storage apparatus replacement necessity setting table 143 (when a failure occurs in the controller 110, the CPU 122 of the controller 120 determines whether operation with the storage apparatus 100 can be continued based on the failure information table and the storage apparatus replacement necessity setting table in the memory 125).

Since a failure has occurred in the controller 120 according to the failure information table 155 of FIG. 9 and the storage apparatus replacement necessity setting table 143 of FIG. 8, it is determined that the storage apparatus needs to be replaced (S310). Since a failure occurred in the controller 120 according to the information shown in FIG. 9 and FIG. 8, when it is determined that the storage apparatus needs to be replaced, the CPU 122 of the controller 110 sets "slave" in the master/slave information 175 of the system LU 162 so that the storage apparatus 100 will become the migration source of data in the replacement of the storage apparatus. Thereby, the storage apparatus 100 will become the data migration source storage apparatus, and, when connected to the storage apparatus 400, it will not longer execute the processing to be executed by the data migration destination storage apparatus (S320).

When the processing at S320 is complete, the backend connection processing at S300 is ended. Thereafter, if it is necessary to replace the storage apparatus, the management server 197 is notified to such effect, and the backend connection processing at S500 is executed (S500). The backend connection processing at S500 is now explained in detail.

<Backend Connection Processing>

Figure 13:
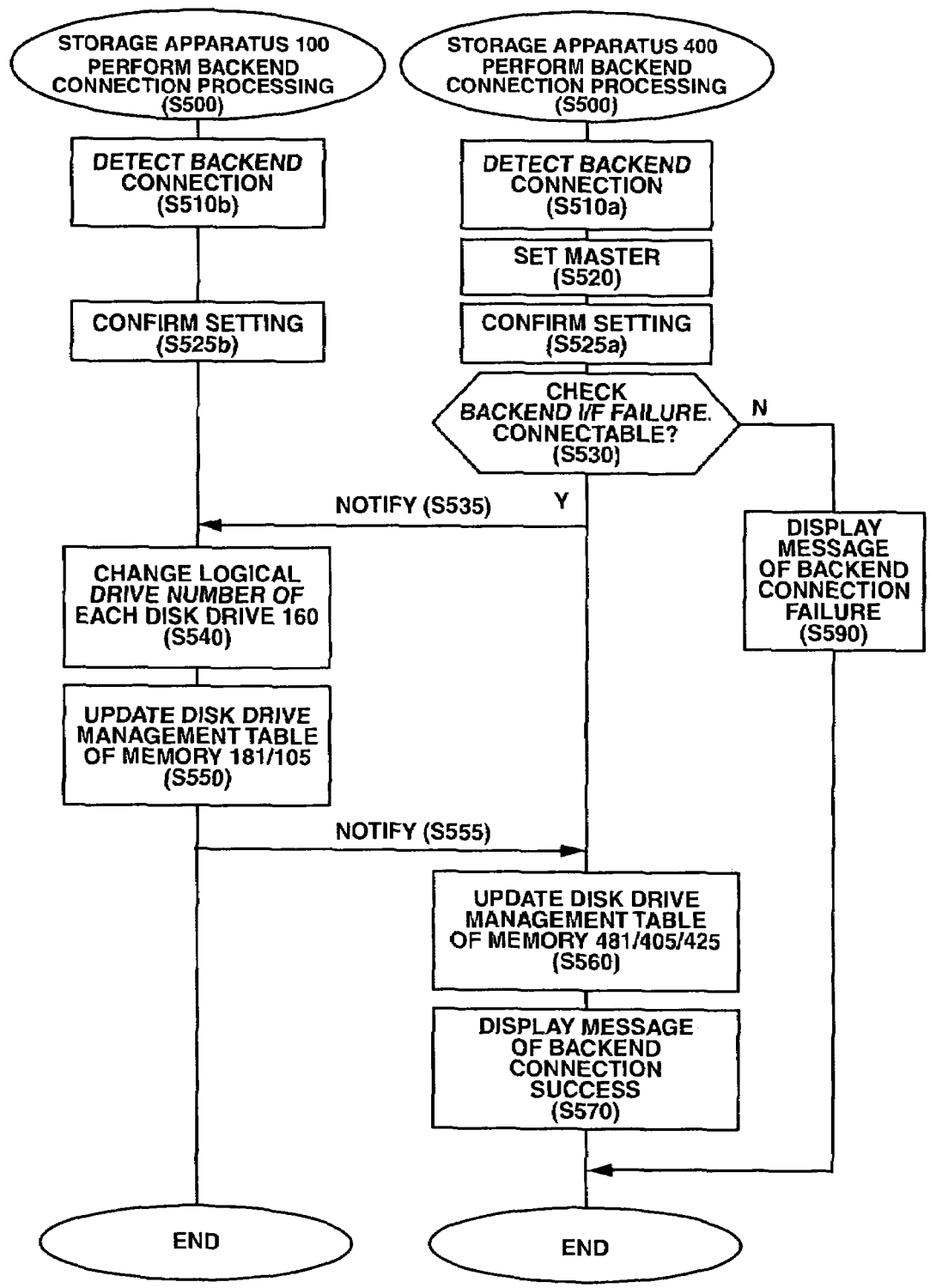
FIG. 13 is a flowchart of backend connection processing.

FIG. 13 shows the details of the backend connection processing. In the backend connection processing at S500, the CPU 412 in the controller 410 of the storage apparatus 400 detects the connection of the storage apparatus 100 and the storage apparatus 400 made by the system engineer according to the notice at S400 shown in the flow of FIG. 11. This detection of the connection between the storage apparatus 100 and the storage apparatus 400 can be realized, for instance, by the backend interface cable 417 sending a signal to the connectee after the system engineer connects the interface cable 80 to the migration destination storage apparatus 400, and the interface cable 80 being connected to the backend interface unit 117 of the migration source storage apparatus and notifying the CPU 412 upon receiving a reply (S510a). The same processing as at S510a is also performed by the migration source storage apparatus 100, and the CPU 112 detects a backend connection thereby (S510b). The processing at S510b is processing required by the migration source storage apparatus 100 as a result of the backend connection when the migration source storage apparatus 100 and the migration destination storage apparatus 400 have the same configuration.

After the detection at S510, the CPU 412 of the migration destination storage apparatus 400 sets "master" in the master/slave information of the system LU 462 when "slave" is not set therein. The CPU 112 of the migration source storage apparatus 100 is not set to "master" even if it detects a backend connection since it has been set with "slave" at S320 (S520).

Setting confirmation processing is thereafter performed. The storage apparatuses 100, 400 have a master/slave selector switch to be switched manually. After the system engineer switches the master/slave selector switch of the storage apparatus 100 to "slave" and the master/slave selector switch of the storage apparatus 400 to "master", the interface cable 80 connects the storage apparatus 100 and the storage apparatus 400. After the master setting processing at S520, the CPU 412 compares the switching of the master/slave selector switch via the backend interface 417 and the master/slave information of the system LU 462 set at S520, and, when the two do not coincide, the CPU 412 notifies the management terminal 198 and makes it display a message so that the system engineer will confirm the switching of the master/slave selector switch (S525a). Since there is a risk of losing data when the master/slave setting is set incorrectly, the processes at S320 and S520 and the manual switching of the master/slave selector switch achieve a double checking process. Incidentally, in addition to setting "master" in the master/slave information of the system LU 462 at S520 when "slave" has not been set, the CPU 412 may refer to the configuration information in the memories 405 and 425 of the storage apparatus 400, and, for instance, set "master" when no information has been set in the LU setting table.

Subsequently, the constituent element management unit 480 in the migration destination storage apparatus 400 set to "master" checks whether a failure has occurred in the backend interface configured from the backend interface units 117, 417, and the interface cable 80 (S530). When a failure has not occurred as a result of this check, the constituent element management unit 480 this to the constituent element management unit 180 in the migration source storage apparatus 100 set to "slave" (S535). After receiving the notice, the constituent element management unit 180 changes the logical drive number 168 in the memory 167 of each disk drive 160 of the migration source storage apparatus 100 to a number set during the slave setting (S540). The logical drive number 168 is an identifier for identifying the disk drive 160 upon accessing the disk drive 160 from the disk interface unit 118. When adopting a configuration where each disk drive 160 is connected with an FC loop (Fibre Channel loop), the disk interface unit 118 designates the loop number and the logical drive number upon making access.

After the processing at S540, the disk drive management table 182 in the memory 181 of the constituent element management unit 180 managing the logical drive number of each disk drive 160 is updated to the changes made at S540. Subsequently, the constituent element management unit 180 notifies the CPU 112 and updates the disk drive management table 141 in the memory 105 of the controller 110 to the same contents as the disk drive management table 182 (S550).

Further, after the processing at S550, the constituent element management unit 180 notifies the constituent element management unit 480 that the logical drive number of each disk drive 160 of the migration source storage apparatus 100 has been changed (S555), and thereafter provides the updated disk drive management table 182 in the memory 181 to the constituent element management unit 480. The constituent element management unit 480 and the CPUs 412 and 422 acquire the changed logical drive number of each disk drive 160 from the updated disk drive management table 182, and updates the disk drive management table of the memories 481, 405 and 425 (S560). Changes to the logical device number 168 and changes to the disk drive management table in the processing at S540 to S560 (hereinafter referred to as the slave-side disk drive logical number change processing) are shown in FIG. 14, FIGS. 15A and 15B.

<Slave-Side Disk Drive Logical Number Change Processing>

FIG. 14 is a block diagram showing images of before and after the changes made to the logical drive number 168 of the disk drive 160.

At flow S540 of FIG. 13, the constituent element management unit 180 of the migration source storage apparatus 100 as the slave changes the logical drive number 168 in the memory 167 of each disk drive 160 as shown in FIG. 14. Specifically, the numerical values of "0", "1" . . . are changed to representations in alphabets such as "A", "B" . . . . As a result of this change, the logical device number of the disk drive of the migration destination storage apparatus 400 as the master and the logical device number of the disk drive of the migration source storage apparatus 100 as the slave will overlap. Based on this change, the controllers 410, 420 of the migration destination storage apparatus 400 as the master will be able uniquely designate and access both disk drives 160, 460.

FIG. 15A shows the disk drive management table after change in the memories 405, 425, 481 of the migration destination storage apparatus 400 as the master. FIG. 15B shows the disk drive management table after change in the memories 105, 181 of the migration source storage apparatus 100 as the slave. As a result of performing the processing at S550 and S560, and the changes will be reflected as shown in FIG. 15. Incidentally, although there is no mention regarding the memory 125 of the controller 120 since this embodiment explains a case where a failure occurred to the controller 120, when a failure occurs in a different part of the storage apparatus 100, the disk drive management table in the memory 125 will also be changed. The migration destination storage apparatus 400 as the master access both disk drives 160 and 460 using the table shown in FIG. 15A, and the migration source storage apparatus 100 as the slave access the disk drive 160 using the disk drive management table shown in FIG. 15B.

After the processing at S540 to S560, the CPU 412 displays a message on the management terminal indicating the success of the backend connection, and ends the backend connection processing S500 (S570).

After the backend connection processing S500 is completed as a result of the foregoing processing, the processing at S600 to S700 (hereinafter referred to as "configuration information referral processing") shown in the flow of FIG. 11 is executed. The configuration information referral processing is now explained in detail.

<Configuration Information Referral Processing>

The CPU 412 of the migration destination storage apparatus 400 accesses the disk drive configuring the system LU 162 among the disk drives 160 of the migration source storage apparatus 100, and reads the configuration information 170 of the migration source storage apparatus 100 (S600, S700). The configuration information 170 of the migration source storage apparatus 100, for instance, could be a configured stored in quintuple in a prescribed area of five disk drives configuring the system LU 162. The logical drive number during the slave setting of the five disk drives 160 and the prescribed area storing the configuration information 170 are set in the data migration program of the memory 405 in the controller 410 in advance, and the CPU 412 is thereby able to access the disk drive configuring the system LU of the migration source storage apparatus, and read and acquire the configuration information 170. The configuration information referral processing is thereby ended.

The configuration information 170 to be read is, as shown in FIG. 2C, the LU configuration information table 172, the host connection mode parameter table 174, the mounted disk drive table 176, the mounted controller table 177, the operating disk drive table 178, the operating controller table 179, and the storage apparatus replacement necessity setting table 173.

As described above, after the configuration information referral processing at S600 to S700 is complete, the setup processing at S800 shown in the flow of FIG. 11 is executed. The setup processing is now explained in detail.

<Setup Processing>

Figure 16:
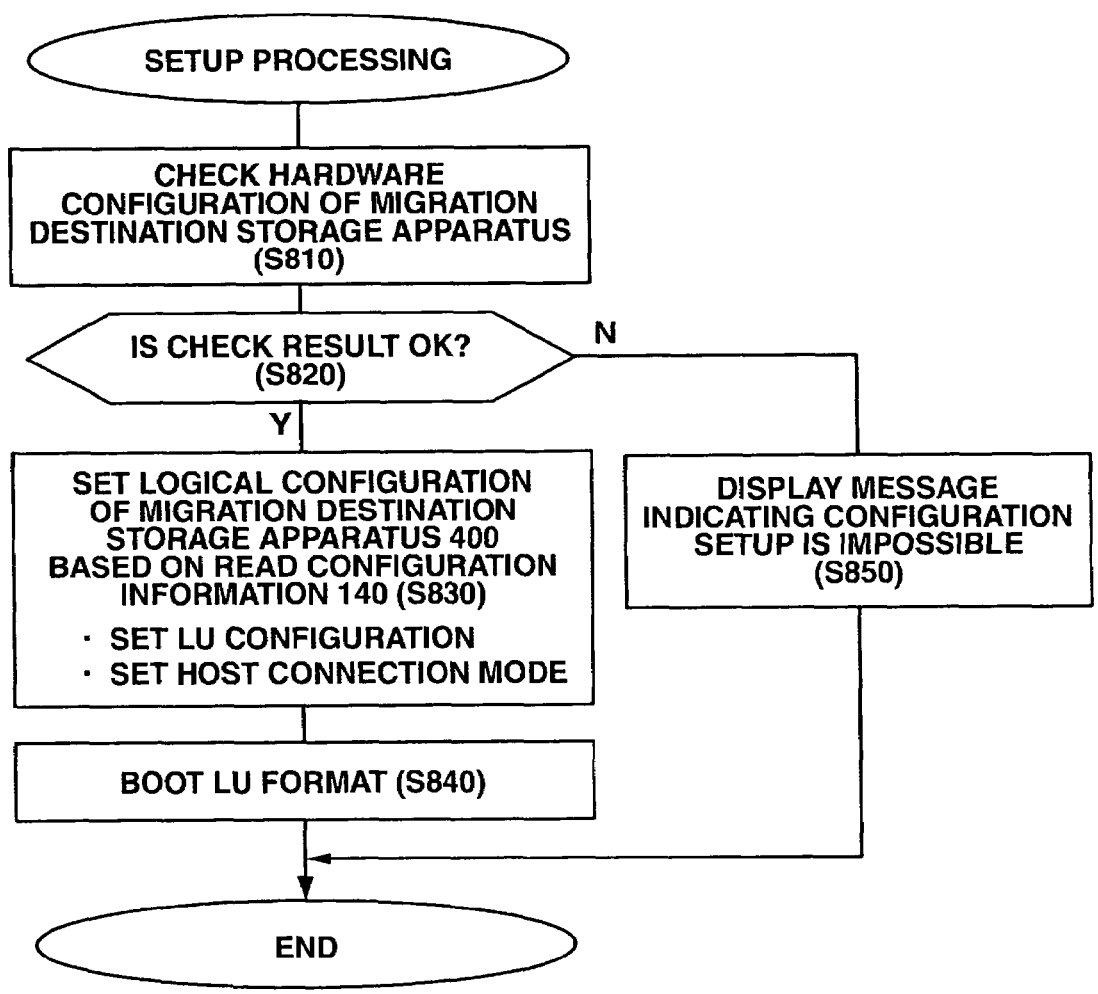
FIG. 16 is a flowchart showing setup processing.

FIG. 16 shows the setup processing. The controller 410 compares the configuration information 170 of the migration source storage apparatus 100 acquired at S700 and the configuration information 440 of the migration destination storage apparatus 400, and checks whether the migration destination storage apparatus possesses a sufficient hardware configuration as the migration destination of the migration source storage apparatus. When the migration destination storage apparatus possesses a sufficient hardware configuration, the CPU 412 determines that the storage apparatus 400 is appropriate as the migration destination data storage apparatus, and sets the check result to "OK" (S810). The hardware configuration check processing of the migration destination storage apparatus at S810 will be described later with reference to FIG. 17A to FIG. 17C.

If the check result at S810 is "OK", (S820: Y), the storage apparatus 400 is set as the takeover destination of the processing of the storage apparatus 100, and a configuration is set in the storage apparatus 400 based on the configuration information 140 acquired at S700. By using the LU configuration table 172 and the host connection mode parameter table 174 during this configuration setting, as in the case of the storage apparatus 100, the storage apparatus 400 is subject to the setting of the LU configuration containing a RAID configuration, logical path setting of each LU and each port, and mode setting for each host 192A to 192C of the controller (S830). Thereafter, the LU format boot processing of the migration destination storage apparatus 400 is performed. This LU format boot processing is automatically performed after the completion of processing at S830 (S840). Meanwhile, when the check result at S830 is "NG", this is notified to the management terminal as an error message (S850). The setup processing S800 is thereby ended. The hardware configuration check processing S810 of the migration destination storage apparatus as a certain process in the setup processing S800 is now explained in detail.

<Hardware Configuration Check Processing of Migration Destination Storage Apparatus>

Figure 17A:
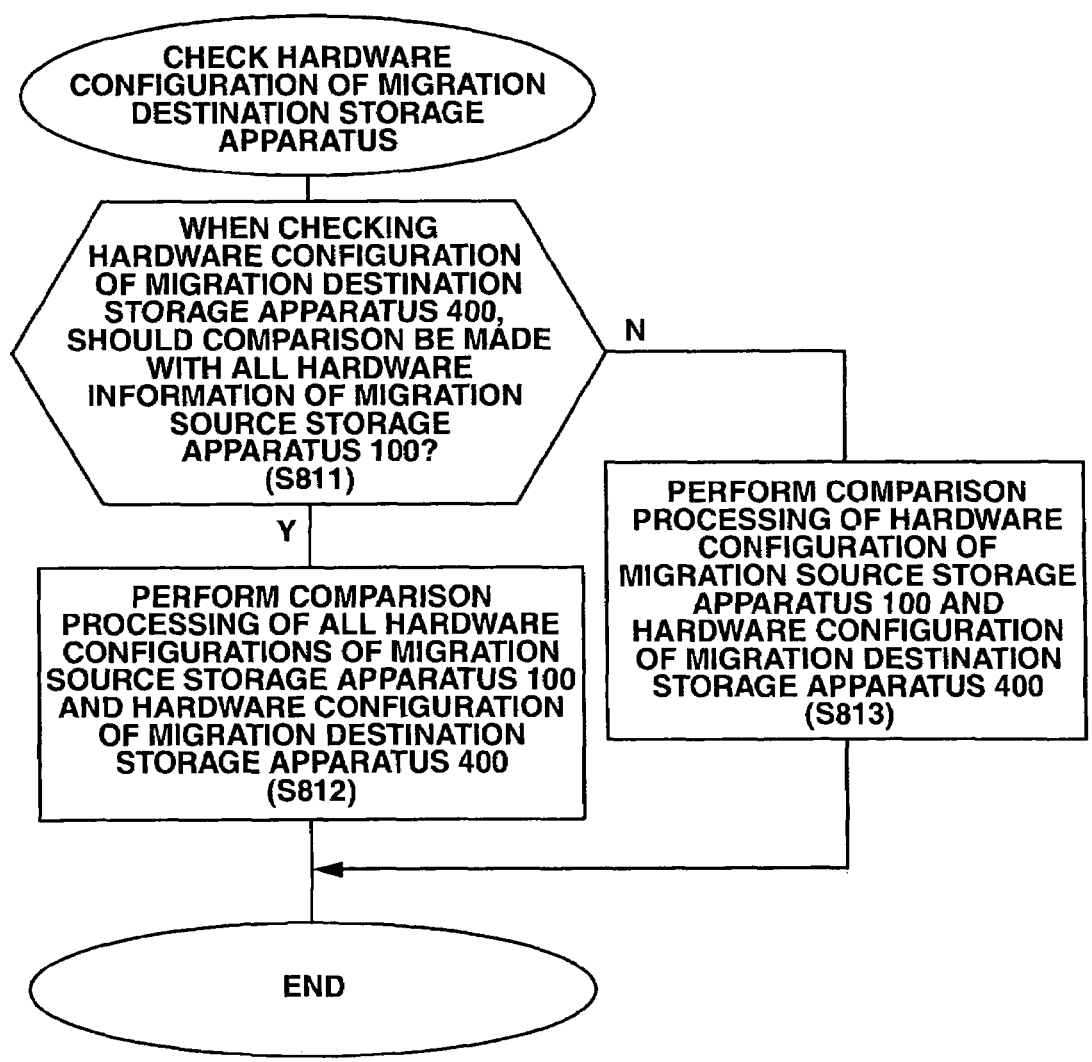
FIG. 17A is a flowchart showing hardware configuration check processing of a migration destination storage.

FIG. 17A shows the hardware configuration check processing of the migration destination storage apparatus. As described above, this check processing is performed for determining whether the storage apparatus 400 possesses a sufficient hardware configuration as the data migration destination of the storage apparatus 100. Foremost, it is determined whether to compare the hardware configuration of the migration destination storage apparatus 400 all hardware configurations of the migration source storage apparatus 100 (S811). In the processing at S811, it is determined whether the specification of the hardware configuration of the migration destination storage apparatus 400 can be set as the takeover destination of the storage apparatus if it is better than the specification of the hardware configuration that was operating in the storage apparatus before the occurrence of a failure, or whether the specification of the hardware configuration of the migration destination storage apparatus 400 will be insufficient as the takeover destination of the storage apparatus unless it is better than the specification of all hardware configurations including the hardware such as disk drives, controllers and ports that were operating in the migration source storage apparatus 100 and the hardware that was not operating before the occurrence of a failure.

The comparison of the hardware configuration specification of the migration source storage apparatus 100 and the migration destination storage apparatus 400 is conducted based on the respective tables of mounted disk drive table 176, mounted controller table 177, operating disk drive table 178, and operating controller table 179 in the configuration information 170 acquired by the migration destination storage apparatus 400 at S700, and the respective tables corresponding to the migration destination storage apparatus 400 set in the memory 405 (the respective tables corresponding to the migration destination storage apparatus 400 are the mounted disk drive table 446, mounted controller table 447, operating disk drive table 448, and operating controller table 449) so as to compare the respective values such as the number of disk drives, capacity, number of controllers, number of ports, and the like.

This determination may be based on the response from the system engineer as a result of the CPU 412 displaying an inquiry message on the management terminal, or set from the management terminal into the memories 405, 425 in advance before the connection of the storage apparatus 400 and the storage apparatus 100. When the determination is "YES" at S811, the comparison processing (S812) shown in FIG. 17B for comparing all hardware configurations of the migration source storage apparatus 100 and the hardware configuration of the migration destination storage apparatus 40 is executed. Meanwhile, when the determination is "NO" at S811, the comparison processing (S813) shown in FIG. 17C for comparing the operating hardware configuration of the migration source storage apparatus 100 and the hardware configuration of the migration destination storage apparatus 400 is executed. Thereby, the check processing S810 of the hardware configuration of the migration destination storage apparatus is ended. Subsequently, the comparison processing S812 for comparing all hardware configurations of the migration source storage apparatus 100 and the hardware configuration of the migration destination storage apparatus 400 as a certain process of the hardware configuration check processing S810 of the migration destination storage apparatus is now explained in detail.

Figure 17B:
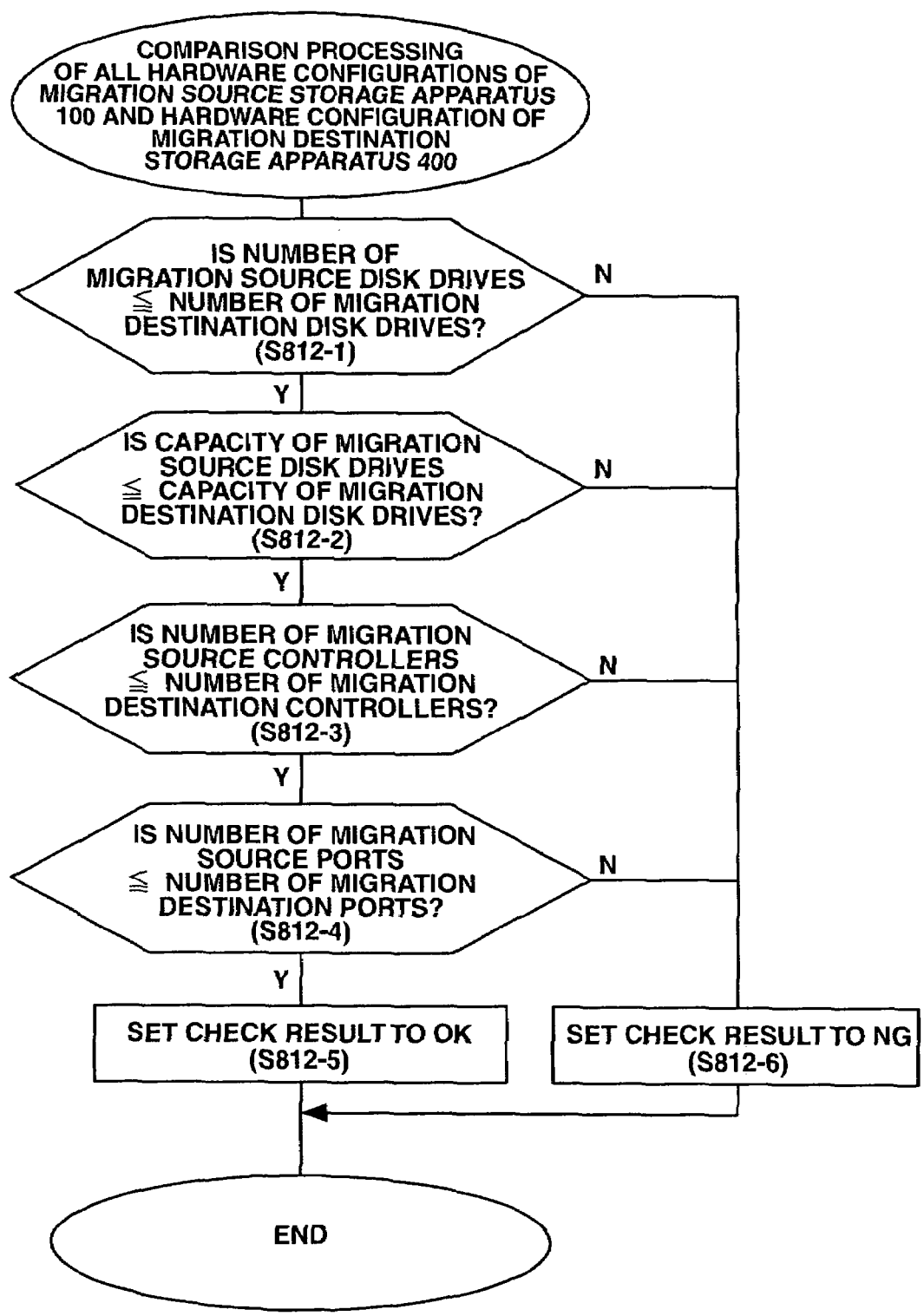
FIG. 17B is a flowchart showing hardware configuration check processing of a migration destination storage.

FIG. 17B shows the comparison processing S812 for comparing all hardware configurations of the migration source storage apparatus 100 and the hardware configuration of the migration destination storage apparatus 400.

The processing at S812 is realized by comparing the mounted disk drive table 176 and the mounted controller table 177 of the migration source storage apparatus 100 read by the storage apparatus 400, and the mounted disk drive table and the mounted controller table of the migration destination storage apparatus. In this processing, the number of disk drives of the disk drive tables 176 and 446 (comparison from the physical drive number) and the capacity of the respective disk drives as the contents shown in FIG. 5, the number of controllers of the mounted controller tables 177 and 447 (comparison from the controller number) as the contents shown in FIG. 6, and the number of ports in each controller are respectively compared. When all elements including the number of disk drives of the mounted disk drive table 446 (physical drive number), capacity of the respective disk drives, number of controllers of the mounted controller table 447 (controller number), and number of ports of the respective controllers are better than the mounted disk device table 176 and the mounted controller table 177 of the migration source storage apparatus 100, the check result is set to "OK", and, if not, the check result is set to "NG". The specific processing of the CPU 412 is now explained.

Foremost, the number of disk drives is compared (S812-1). When the number of disk drives of the mounted disk drive table 446 is less than the number of disk drives of the mounted disk drive table 176, the determination is "NO", and, if not, the determination is "YES".

Subsequently, the disk drive capacity is compared (S812-2). When the number of disk drives of the mounted disk drive table 446 is greater than the number of disk drives of the mounted disk drive table 176, in the association of the respective disk drives with the mounted disk device table 446 and the mounted disk device table 146, when the capacity of the disk drive of the mounted disk device table 446 is associated to be greater than the capacity of the disk drive of the mounted disk drive table 176, the determination is "YES" regarding the disk drives, and, if not, the determination is "NO".

After the processing at S812-2, the number of controllers is compared (S812-3).

When the determination is "YES" regarding the disk drives, the comparison of the mounted controller table 447 and the mounted controller table 177 is subsequently performed.

In the comparison of the mounted controller table 177 and the mounted controller table 447, the number of controllers of the respective tables (size of controller number) is compared, and, when the number of controllers of the mounted controller table 447 is less than the number of controllers of the mounted controller table 177, the determination is "NO", and, if not, the determination is "YES".

Subsequently, the number of ports is compared (S812-4).

When the number of controllers of the mounted controller table 447 is greater than the number of controllers of the mounted controller table 177, in the association of the respective controllers with the mounted controller table 447 and the mounted controller table 177, when the number of ports of the controller of the mounted controller table 447 is associated to be greater than the number of ports of the controller of the mounted controller table 177, the determination is "YES" regarding the number of ports of the controller, and, if not, the determination is "NO".

When the determination is "YES" at S812-4, the CPU 412 sets the check result to "OK" at S812-5. Meanwhile, when the determination is "NO" at S812-1 to S812-4, the CPU 412 sets the check result to "NG".

Incidentally, in addition to the capacity of the disk drives, the rotating speed of the disk drives may be added to the processing at S812-1 to S8124 as a parameter to be used in this determination. Here, regarding the disk drives of the storage apparatus 400, the determination of "YES" is only given when the number of disk drives, capacity of the disk drives, and the rotating speed of the disk drives all exceed the storage apparatus 100. Here, in the association of the respective disk drives with the mounted drive table 446 and the mounted drive table 176, whether there is a disk drive of the mounted drive table 446 exceeds the disk drive of the mounted drive table 176 in the combination of the disk drive capacity and the disk drive rotating speed is confirmed, and the determination is "YES" when such combination exists, and, if not, the determination is "NO". Thereby, the comparison processing S812 for comparing all hardware configurations of the migration source storage apparatus 100 and the hardware configuration of the migration destination storage apparatus 400 is ended. Subsequently, the comparison processing (S813) for comparing the operating hardware configuration of the migration source storage apparatus 100 and the hardware configuration of the migration destination storage apparatus 400 when the determination is "NO" in the determination processing S811 for comparing the hardware configuration of the migration destination storage apparatus 400 and all hardware configurations of the migration source storage apparatus 100 is now explained in detail.

Figure 17C:
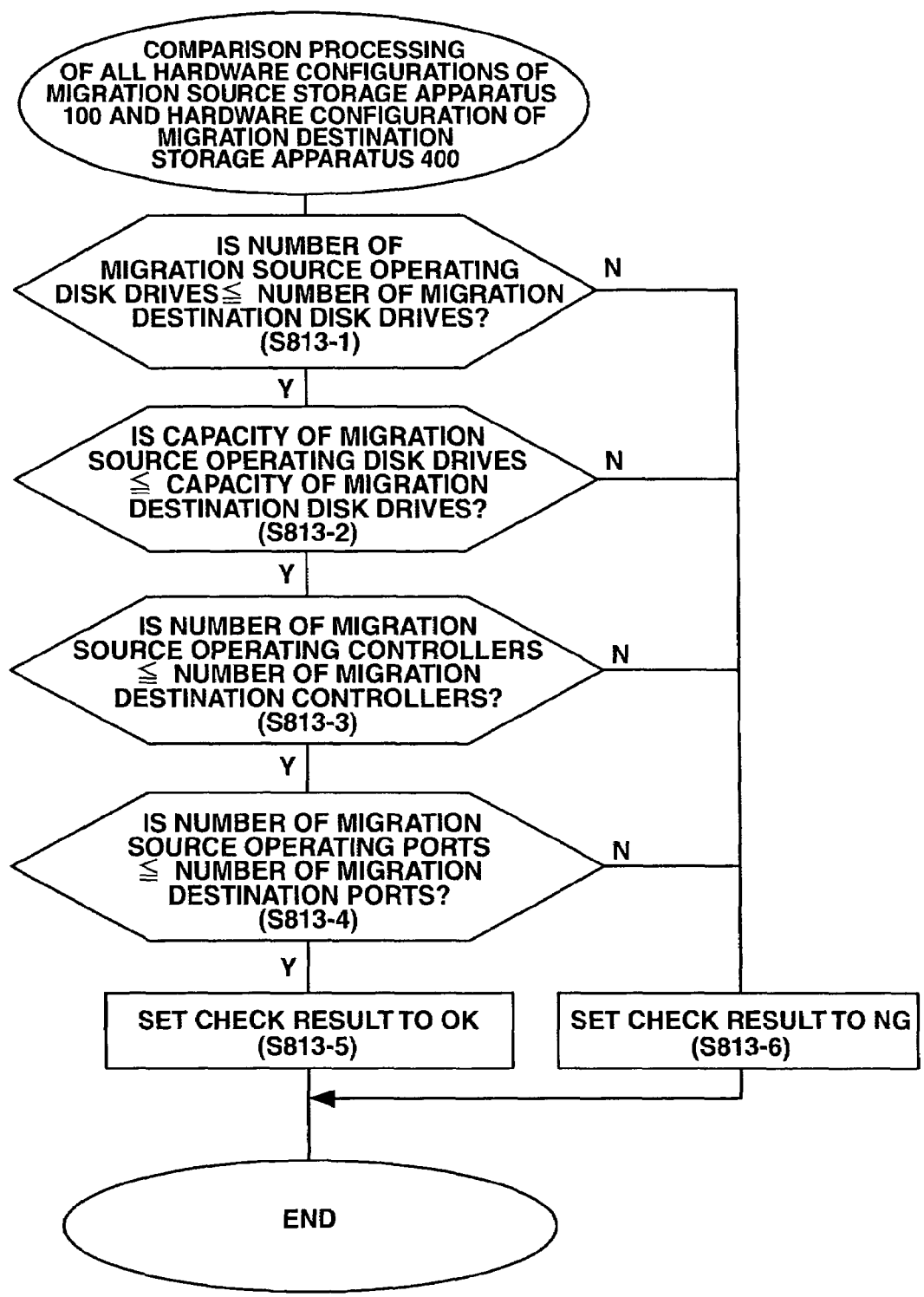
FIG. 17C is a flowchart showing hardware configuration check processing of a migration destination storage.

FIG. 17C shows the comparison processing S813 for comparing the operating hardware configuration of the migration source storage apparatus 100 and the hardware configuration of the migration destination storage apparatus 400.

Figure 20:
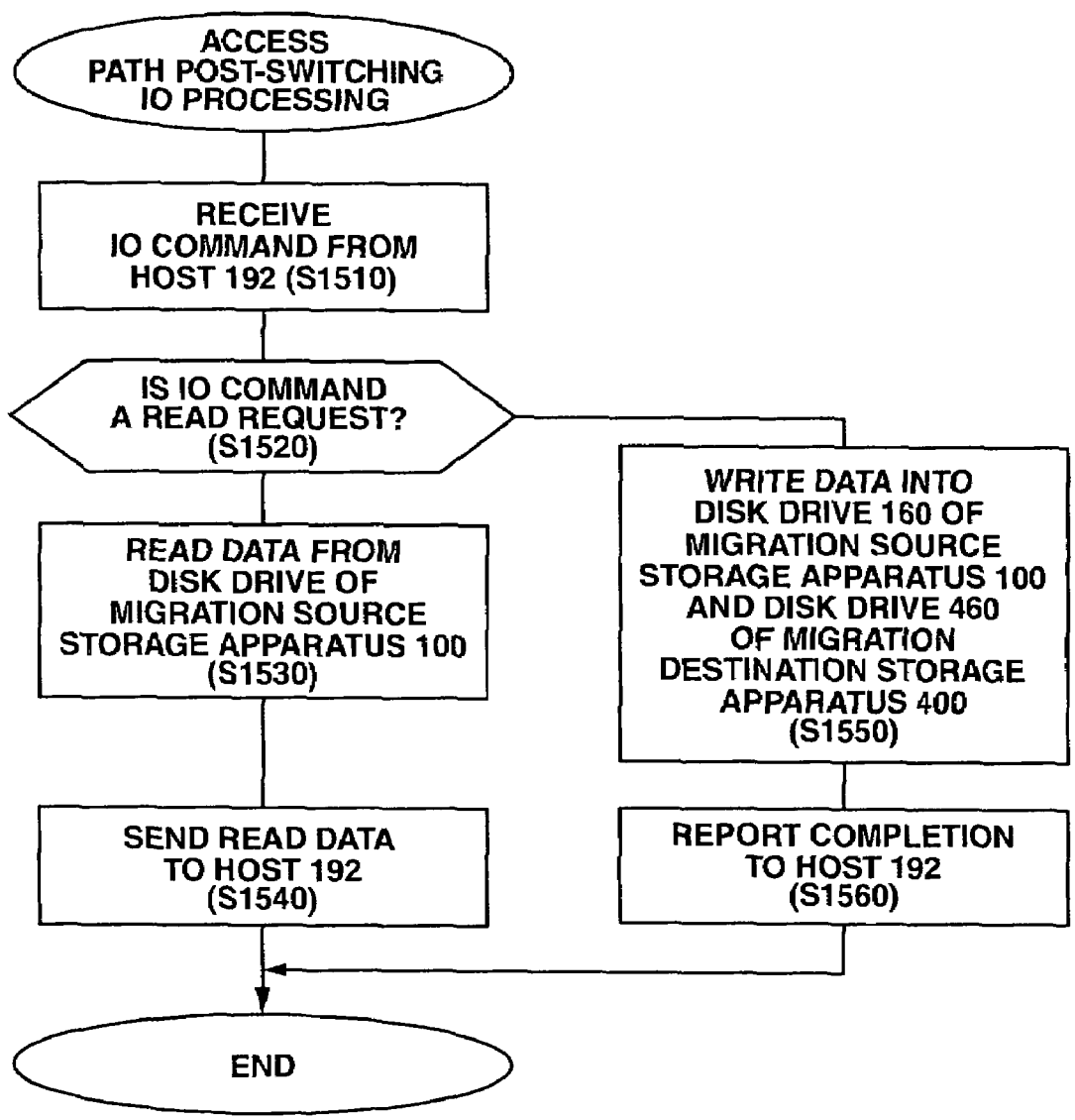
FIG. 20 is a flowchart showing access post-switching IO processing.

In the processing at S813, comparison processing is performed using the operating disk drive table 178 having the contents shown in FIG. 19 and the operating controller table 179 shown in FIG. 20, which are tables set based on the LU configuration table 142, the host connection mode parameter setting table 144, and the mounted drive table 146. The allocation amount to the LU of the operating disk drive table 178 is calculated from the LU capacity and the RAID level of the LU configuration table. In the processing at S813-1 to S813-4, regarding the disk drives, instead of the mounted drive table 176 in the processing at S812-1 to S8124 described above, processing for comparing the operating disk drive table 178 and the mounted disk drive table 446 of the storage apparatus 400 is performed. In the comparison processing for comparing the operating disk drive table 148 and the mounted disk drive table 446, the drive number and the allocation capacity (rotating speed) of the operating disk drive table 148 are subject to the same processing as the comparison processing performed at S812 for comparing the mounted disk drive table 176 and the mounted disk drive table 446. The controllers and the number of ports provided to the controllers are also subject to the comparison processing for comparing the operating controller table 179 and the mounted controller table 447 as with the comparison processing of the mounted controller table 177 and the mounted controller table 447. When the determination is "YES" in the processing at S813-1 to S813-4, the check result is set to "OK" (S813-5), and, when the determination is "NO", the check result is set to "NG" (S813-6).

As a result of the foregoing processing, the check processing S810 of checking whether the migration destination storage apparatus 400 comprises a sufficient hardware configuration as the migration destination of the migration source storage apparatus 100 is ended.

Incidentally, this embodiment explained a case of selecting either the comparison processing (S812) for checking whether the hardware configuration specification of the migration destination storage apparatus 400 is better than the hardware configuration specification of the migration source storage apparatus 100 (whether the respective numerical values such as the number of hard disks, capacity, number of controllers, and number of ports provided to the controllers of the migration destination storage apparatus 400 are the same as or better than the migration source storage apparatus 100) regardless of the operating status of the storage apparatus 100 before the occurrence of a failure, or the comparison processing (S813) for checking whether the hardware configuration specification of the migration destination storage apparatus 400 is better than the hardware configuration specification that was operating in the migration source storage apparatus 100 before the occurrence of a failure. Nevertheless, by foremost performing the comparison processing at S812 and obtaining a result of "NG", if the result is "OK" at S813, it is also possible to start S813 after inquiring the system manager whether the storage apparatus 400 can be used as the migration destination storage.

The setup processing S800 was explained in detailed above. After the setup processing S800 is complete, the CPU 412 of the migration destination storage apparatus 400 ends the setup of the management server 197, and sends a notice indicating that access from the host can be received (S900).

Upon receiving the notice, the management server 197 associates the WWN (World Wide Name: identifier for uniquely identifying a port on the network) of the host port of the migration source storage apparatus 100 that it is managing, and the WWN of the host port of the migration destination storage apparatus, notifies such association to the host 192, and urges the access path switching application provided to the host 192 to switch the access path from the migration source storage apparatus 100 to the migration destination storage apparatus 400 (S1000). The access path switching application of the host 192 recognizes the WWN of the host port of the migration destination storage apparatus 400 associated with the host port of the migration source storage apparatus 100 sent from the management server 192, and thereafter sends a connection confirmation command to the migration destination storage apparatus 400 via the network 190 upon designating the WWN recognized for confirming whether connection is possible (S1000). As a result of the storage apparatus 400 replying to this command (S1200), the access path switching application executes the switching of the access path (S1300).

Incidentally, in the processing at S900 to S1300, the following method may also be adopted without using the access path application in the management server 197 and the host 192. After the setup processing at S800 is ended, the migration destination storage apparatus 400 displays a message on the management terminal to the effect that the setup processing has ended and the access path can be received from the host. Thereupon, the system engineer temporarily discontinues the IO processing of the host 192 and performs input operations for setting the access path. During the input operations, the access path can be switched from the migration source storage apparatus 100 to the migration destination storage apparatus, and the IO processing can be resumed thereafter.

Subsequently, the IO command is sent to the migration destination storage apparatus 400 (S1400). The access path post-switching IO processing S1500 to be executed by the storage apparatus 400 when the IO command is sent to the migration destination storage apparatus 400 is now explained in detail.

<Access Path Post-Switching IO Processing>

FIG. 20 shows the IO processing of after the switching of the access path.

The migration destination disk array device 400 receives the IO command sent from the host 192 via the switched access path (S1510). The CPU 412 analyzes the received IO command and determines whether the IO command is a read request (S1520). When it is a read request (S1520: Y), the CPU 412 reads data from the disk drive 160 configuring the data LU 164 of the migration source storage apparatus 100 according to the LU number (and LBA) designated with the IO command via the backend connection interface unit 417 (S1530), and sends this data to the host 192 (S1540).

Meanwhile, when the received IO command is not a read request and is a write request (S1530: N), the CPU 412 performs write processing to the disk drive 460 configuring the data LU 464 in the self-apparatus according to the LU number (and LBA) designated in the IO command, and performs write processing to the disk drive 160 configuring the data LU 164 of the migration source storage apparatus 100 via the backend interface 417 (S1550). After the write processing is complete, a completion notice is sent to the host 192 (S1560).

Incidentally, as described in the explanation of the flow in FIG. 11, the data migration processing at S1600 may also be executed between S900 and S1500. Based on this premise, the reason data is read from the disk drive of the migration source storage apparatus 100 in the read processing at S1530 is because although there would be no problem of reading data from either disk drive of the migration source storage apparatus 100 or the migration destination storage apparatus 400 regarding the read processing of data which was already subject to the data migration processing between the storage apparatuses, in the case of performing read processing of data that has not yet been subject to data migration, there is a problem in that the read requested to be subject to read processing does not exist in the disk drive 460 of the migration destination storage apparatus 400, and only exists in the disk drive 160 of the migration source storage apparatus 100.

Further, the reason write processing is performed to both disk drives of the migration source storage apparatus 100 and the migration destination storage apparatus 400 is explained below. The reason data is written in the disk drive of the migration source storage apparatus is because the read processing from the host 192 will all be performed to the disk drive of the migration source storage apparatus until the completion of data migration, and it needs to reflect the write data from the host 192. Moreover, the reason data is also written in the disk drive 460 of the migration destination storage apparatus 400 is because, when write processing is to be performed to data that has not yet been subject to data migration processing, even if write processing is performed only to the disk drive 160 of the migration source storage apparatus 100, there is no problem since the data reflecting the write processing will be copied to from the disk drive 160 of the migration source storage apparatus 100 to the migration destination disk drive 460. But regarding data that has already been subject to data migration, when data is not written into the disk drive 460 of the migration destination storage apparatus 400, data reflecting the write processing will not be copied, and there is a problem in that the data reflecting the write processing will not exist in the disk drive of the migration destination storage apparatus 400. In order to avoid the foregoing situation, write processing is performed to both disk drives of the migration source storage apparatus 100 and the migration destination storage apparatus 400. As described above, by reading data from the disk drive of the migration source storage apparatus 100 in read processing, and writing data in both the disk drive 160 of the migration source storage apparatus 100 and the disk drive 460 of the migration destination storage apparatus 400 in write processing, it is possible to perform the read request and write request from the host 192 without omission and without depending on the progress of the data migration processing S1600.

Incidentally, for instance, another configuration may be adopted of providing bitmaps for managing the data migration progress per prescribed area in the memory 405, and, without performing write processing to both the disk drive 460 of the migration destination disk array device 400 and the disk drive 160 of the migration destination disk array device 100, writing data in both disk drives of the migration source storage 100 and the migration destination storage 400 of data migration is complete, and writing data only in the disk drive 160 of the migration source storage apparatus 100 for write processing to an area not yet subject to data migration. Here, although it will become necessary to manage the data migration progress between the storage apparatuses, it will be possible to alleviate the processing load on the host 10 processing in the storage apparatus 400.

The access path post-switching IO processing S1500 has been explained in detail above. The data migration processing S1600 to be executed after the access path post-switching IO processing 1500 or during the processing at S900 to S1500 is now explained in detail.

<Data Migration Processing>

Figure 21:
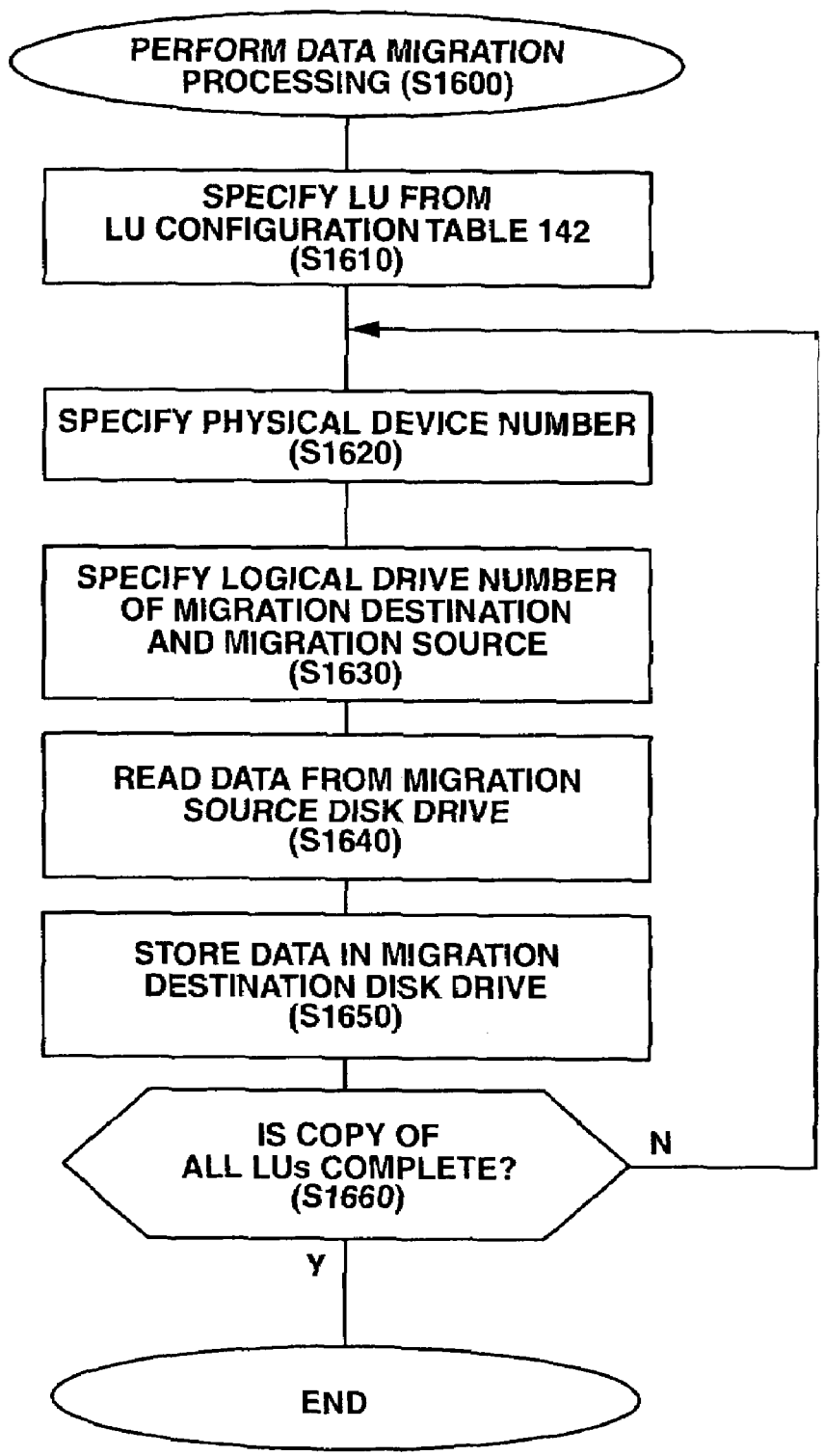
FIG. 21 is a flowchart showing data migration processing.

FIG. 21 shows the data migration processing.

The CPU 412 of the migration destination storage apparatus 400 specifies the data LU 162 to copy data based on the LU management table of the configuration information 170 acquired at S700, and specifies the physical drive number of the disk drive 160 configuring the data LU 162. Thereafter, the CPU 412 specifies the physical drive number of the disk drive configuring the LU of the migration destination storage apparatus 400 logically set according to the LU in the logical setting at setup processing S830 (S1610, S1620). Subsequently, the CPU 412 specifies the logical drive number of the disk drives 160, 460 based on the disk drive management table in the memory 105 (S1630). The CPU 412 thereafter read data from the disk drive 160 and writes data in the disk drive 460 (S1630, S1640). The processing at S1610 to S1640 is executed until the processing regarding all LUs are complete, and the data migration processing is ended when all LUs are complete.

Incidentally, for instance, if this data migration processing is performed in a situation where the collection copy by the RAID group is required due to a failure of the disk drive 160, it is possible to read data from the disk drive 160, recover the data based on such collection copy, and store such data in the disk drive 460.

When recognizing the completion of processing at S1600, the CPU 412 of the migration destination storage apparatus 400 deletes the data of all disk drives 160 of the migration source storage apparatus 100. This is in order to avoid the risk of data being leaked after the migration source storage apparatus 100 completes the processing between the storage apparatuses, or when it is abandoned or collected.

As described above, according to the present invention, in a storage apparatus comprising parts such as disk drives, controllers, fans, and power supply units as well as the replacement parts thereof, even when a failure occurs in each of the parts, it is possible to provide a storage apparatus where the processing of the defective part is taken over by the replacement part until the entire storage apparatuses needs to be replaced and operation is continued without conducting replacement in part units, and where another storage apparatus is able to take over the processing when the storage apparatus needs to be replaced.

According to the present invention, even when a failure occurs in each part (particularly the controller) of the storage apparatus and the operation of the storage apparatus cannot be continued, it is possible to provide a storage apparatus in which another storage apparatus can easily take over the processing. Incidentally, according to the processing at S500 onward of the present invention, it is possible to realize data migration processing while alleviating the burden on the system engineer, regardless of the occurrence of a failure.

Thus, according to the present invention, even when a failure occurs to a part configuring the storage apparatus, it is possible to provide a storage apparatus capable of operating for a long period of time without having to replace the part, and the burden on maintenance can be alleviated in comparison to conventional storage apparatuses.

Incidentally, in the present embodiment, although the respective parts such as disk drives, controllers, fans, and power supply units all included their respective replacement parts, not all of the parts have to include replacement parts. For example, it is possible to adopt a configuration where the fan does not have a replacement part. Here, when a failure occurs in one fan among a plurality of fans, so as long as the number of fans operating without failure is greater than a prescribed number (for instance, the prescribed number is set to 3 when there are 4 fans), the CPU 112 may determine that the operation can be continued, and, when a failure occurs to another fan and the number of operating fans falls below the prescribed number, the CPU 112 may determine that the storage apparatus needs to be replaced (S300), and notify the management server (S400). In this case, when the temperature of the storage apparatus rises above a prescribed temperature, the CPU 112 may also determine that the storage apparatus needs to be replaced.

Incidentally, although this embodiment separately described the management server 197 as a server with high processing capacity and the management terminal 198 as a laptop computer, they are both management computers, and, for instance, without providing the management terminal 198, the management server 197 may perform the processing of the management terminal 198, or, contrarily, the management terminal 198 may perform the processing of the management server 197.

We claim:

1. A storage system connected to a host computer, comprising:
   a plurality of first disk drives for storing data;
   a plurality of first controllers that receive an I/O request from said host computer and controls a plurality of first logical units configured by said plurality of first disk drives;
   a first memory that stores configuration information, failure information, and storage system replacement information,
   wherein said configuration information indicates relationships between said first logical units and said first disk drives,
   wherein said failure information indicates a failure status of each of said first controllers and said first disk drives, and
   wherein said storage system replacement information indicates a first threshold value of said failure status of said first controllers and a second threshold value of said failure status of said first disk drives for replacing said storage system with another storage system; and
   a connection interface unit to be connected to said another storage system, said another storage system comprising a plurality of second disk drives for storing data, a plurality of second controllers for controlling a plurality of second logical units configured by said second disk drives, and a second memory,
   wherein, when a failure occurs in any one of said plurality of first controllers or any one of said plurality of first disk drives, resulting in a faulty first controller or a faulty first disk drive, respectively, said failure status of said faulty first controller or said failure status of said faulty first disk drive in the failure information is updated, and
   wherein when said failure status of said first controllers in said undated failure information exceeds said first threshold value or said failure status of said first disk drives in said updated failure information exceeds said second threshold value, said configuration information stored in said first memory is sent to said another storage system through said connection interface unit so that said configuration information is stored in said second memory, and then data stored in said first disk drives which configure said first logical units is sent to said another storage system so that said data is stored in said second disk drives through said connection interface unit, and consequently, said another storage system processes said I/O request from said host computer instead of said storage system.

2. The storage system according to claim 1, further connected to a management computer, wherein said controller provides notification of the replacement of said storage system with said another storage system to said management computer.

3. The storage system according to claim 1, wherein said threshold value is 1.

4. The storage system according to claim 1,
   wherein said first controllers and said plurality of disk drives are connected via a first path, and
   wherein said connection interface unit and said plurality of disk drives are connected via a second path.

5. The storage system according to claim 1, further comprising:
   a plurality of fans for cooling said controller, wherein, when any one of said plurality of fans is subject to a failure, said controller externally notifies a replacement of said storage system based on the number of fans subject to failure.

6. The storage system according to claim 1, further comprising:
a case for storing said controller and said plurality of disk drives,
wherein said case does not have a replacement port of said plurality of disk drives.

7. The storage system according to claim 1,
wherein said failure status of said first controllers is based on a number of normally-operating first controllers,
wherein said failure status of said first disk drives is based on a number of normally-operating first disk drives, and
wherein when the number of normally-operating first controllers is less than said first threshold value or when the number of normally-operating first disk drives is less than said second threshold value, a determination is made that the storage system needs to be replaced.

8. A system connected to a host computer, comprising:
a first storage system having a plurality of first disk drives that store data sent from said host computer, a of first controllers for setting a plurality of first logical units to a first storage extent of said plurality of first disk drives, a first interface unit, and a first memory; and
a second storage system having a plurality of second disk drives that store data, and a plurality of second controllers for setting a plurality of second logical units to a second storage extent of said plurality of second disk drives, a second interface unit, and a second memory,
wherein said first memory stores configuration information, failure information, and storage system replacement information,
wherein said configuration information indicates relationships between said first logical units and said first disk drives,
wherein said failure information indicates a failure status of each of said first controllers and said first disk drives,
wherein said storage system replacement information indicates a first threshold value of said failure status of said first controller and a second threshold value of said failure status of said first disk drives for replacing said first storage system with said second storage system,
wherein said first interface unit in said first storage system is connected to said second interface unit in said second storage system,
wherein, when a failure occurs in any one of said plurality of first controllers or any one of said plurality of first disk drives, resulting in a faulty first controller or a faulty first disk drive, respectively, said failure status of said faulty first controller or said failure status of said faulty first disk drive in the failure information is updated, and
wherein when said failure status of said first controllers in said updated failure information exceeds said first threshold value or said failure status of said first disk drives in said updated failure information exceeds said second threshold value, said second controllers in said second storage system read said configuration information stored in said first memory to store said configuration information in said second memory through said connection interface unit, and then said second controllers in said second storage system read data stored in said first disk drives to store said data in said second disk drives through said connection interface unit by referring to said configuration information stored in said second memory, so that said second storage system processes said I/O request from said host computer instead of said first storage system.

9. The system according to claim 8,
wherein certain first disk devices of said plurality of first disk devices store configuration information containing information showing the relationship of said plurality of logical unit and said plurality of first disk device in a prescribed storage extent, and
wherein said second controller has a memory, and reads said configuration information from said certain first disk devices based on address information of said prescribed storage extent pre-set in said memory, and copies data of said plurality of first disk devices to said second disk device based on said configuration information.

10. The system according to claim 9,
wherein said storage system has a management unit, and
wherein, after detecting the connection of said first storage system and said second storage system, said management unit changes a plurality of first logical device numbers as identifiers for identifying said plurality of first disk drives from said first controller and said second controller.

11. The system according to claim 9,
wherein said first controller has a first connection interface unit to be connected to said second storage, system,
wherein a path of said first controller and said plurality of first disk drives and a path of said first connection interface unit and said plurality of first disk drives are different,
wherein said second controller has a second connection interface unit to be connected to said first storage system, and
wherein a path of said second controller and said plurality of second disk drives and a path of said second connection interface unit and a path of said plurality of second disk drives are different.

12. The system according to claim 9,
wherein said configuration information contains hardware information showing the number and capacity of said plurality of first disk devices, and
wherein said second controller determines whether to copy data of said plurality of first disk drives to said plurality of second disk drives based on said hardware information.

13. The system according to claim 8,
wherein said failure status of said first controllers is based on a number of normally-operating first controllers,
wherein said failure status of said first disk drives is based on a number of normally-operating first disk drives, and
wherein when the number of normally-operating first controllers is less than said first threshold value or when the number of normally-operating first disk drives is less than said second threshold value, a determination is made that the first storage system needs to be replaced.

* * * * *